(12) United States Patent
Handelman

(10) Patent No.: US 6,763,191 B1
(45) Date of Patent: Jul. 13, 2004

(54) OPTICAL SWITCHING APPARATUS AND METHODS

(75) Inventor: Doron Handelman, 14 Hamaavak Street, Givatayim 53520 (IL)

(73) Assignees: ECI Telecom Ltd., Petach-Tikva (IL); Doron Handelman, Givatayim (IL)

(*) Notice: Subject to any disclaimer, the term of this patent is extended or adjusted under 35 U.S.C. 154(b) by 603 days.

(21) Appl. No.: 09/624,983

(22) Filed: Jul. 25, 2000

(51) Int. Cl.[7] .............................................. H04J 14/00
(52) U.S. Cl. .............................. 398/45; 398/47; 398/49
(58) Field of Search .............................. 359/123, 128, 359/135, 137, 138, 139; 398/34, 35, 45, 47, 48, 49, 52, 68, 71

(56) References Cited

U.S. PATENT DOCUMENTS

| | | | |
|---|---|---|---|
| 4,626,075 A | | 12/1986 | Chemla |
| 4,726,010 A | * | 2/1988 | Ali et al. ....................... 398/75 |
| 5,170,273 A | | 12/1992 | Nishio |
| 5,191,457 A | | 3/1993 | Yamazaki |
| 5,194,977 A | | 3/1993 | Nishio |
| 5,319,484 A | * | 6/1994 | Jacob et al. ................... 398/75 |
| 5,325,222 A | * | 6/1994 | Jacob et al. ................... 398/75 |
| 5,400,322 A | | 3/1995 | Hunt et al. |
| 5,416,625 A | * | 5/1995 | Cavaciuti et al. ............. 398/98 |
| 5,452,115 A | | 9/1995 | Tomioka |
| 5,457,687 A | | 10/1995 | Newman |
| 5,479,447 A | | 12/1995 | Chow et al. |
| 5,557,439 A | | 9/1996 | Alexander et al. |
| 5,680,490 A | | 10/1997 | Cohen et al. |
| 5,712,932 A | | 1/1998 | Alexander et al. |
| 5,724,167 A | | 3/1998 | Sabella |
| 5,739,935 A | | 4/1998 | Sabella |
| 5,774,244 A | | 6/1998 | Tandon et al. |
| 5,867,289 A | | 2/1999 | Gerstel et al. |
| 5,953,138 A | * | 9/1999 | Ellis .............................. 398/75 |
| 6,023,360 A | * | 2/2000 | Morioka et al. ................ 398/1 |
| 6,108,112 A | | 8/2000 | Touma |
| 6,204,944 B1 | * | 3/2001 | Uchiyama et al. ............ 398/79 |
| 6,233,082 B1 | | 5/2001 | Johnson |
| 6,288,808 B1 | * | 9/2001 | Lee et al. ....................... 398/49 |
| 6,314,115 B1 | * | 11/2001 | Delfyett et al. ................. 372/6 |

OTHER PUBLICATIONS

A Justification for a Variable Bandwidth Allocation Methodolgy for Sonet Virtually Concatenated SPEs, Nevin Jones and Trevor Wilson, Lucent Technologies, Jul. 10–14, 2000.
Higher Order Sonet Virtual Concatenation, Nevin Jones, Paul Langner & Charles Webb, Lucent Technologies, Apr. 9, 1999.
The Communications Handbook, 1997, Chapter 39, pp. 542–553.

(List continued on next page.)

*Primary Examiner*—Leslie Pascal
*Assistant Examiner*—Dzung Tran
(74) *Attorney, Agent, or Firm*—Browdy and Neimark, P.L.L.C.

(57) ABSTRACT

An optical switching apparatus in an optical communication network selectively combines and separates series of optical signal samples using OTDM and/or WDM. In upstream communication, the optical switching apparatus optically converts n series of upstream optical signal samples having the upstream optical signal samples carried over channel wavelengths $\lambda_1, \ldots, \lambda_n$ at data rates $DR_1, \ldots, DR_n$ respectively into a combined series of upstream optical signal samples having the upstream optical signal samples carried over a channel wavelength $\lambda_D$ at a combined data rate $DR_c$ which is greater than any one of the data rates $DR_1, \ldots, DR_n$. The combined series of upstream optical signal samples is then routed to a destination route. In downstream communication, the optical switching apparatus optically converts a series of downstream optical signal samples carried over a channel wavelength $\lambda_T$ at a data rate $DR_T$ into nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$. The nn series of downstream optical signal samples are then routed to nn routes respectively. Related apparatus and methods are also described.

33 Claims, 7 Drawing Sheets

OTHER PUBLICATIONS

The Communications Handbook, 1997, Chapter 40, pp. 554–564.

Mining the Optical Bandwidth for a Terabit per second, Alan Wilner, IEEE Spectrum, Apr. 1997, pp. 32–41.

Record data–transmission rate reported at ECOC '96, Laser Focus World, Nov. 1996, pp. 40–42.

Multiple Wavelengths Exploit Fiber Capacity, Eric Lerner, Laser Focus World, Jul. 1997, pp. 119–125.

Advances in Dense WDM push diode–laser design, Diana Zankowsky, Laser Focus World, Aug. 1997, pp. 167–171.

Multistage Amplifier Provides gain across 80 nm, pp. 22–23.

Optical Switching promises cure for telecommunications logjam, Jeff Hecht, Laser Focus World, Sep. 1998, pp. 69–72.

The Communications Handbook, Jeffrey Gibson, 1997, pp. 883–890.

WDM Local Area Networks, Kazovsky et al, IEEE LTS, May 1992, pp. 8–15.

Optical Switches Ease Bandwidth Crunch, EuroPhotonics, Rien Flipse, Aug./Sep. 1998, pp. 44–45.

Speed Demons: Is Faster Better and Cheaper? Stephanie Weiss, Photonics Spectra, Feb. 1999, pp. 96–102.

Wavelength Lockers Keep Lasers in Line, Ed Miskovic, Photonics Spectra, Feb. 1999, pp. 104–110.

Optical Switches Pursue Crossconnect Markets, Hassaun Jones–Bey, Laser Focus World, May 1998, pp. 153–162.

Demand Triggers Advances in Dense WDM Components, Raymond Nering, Optoelectronics World, Sep. 1998, pp. S5–S8.

Optical Networks, Hector Escobar, Photonics Spectra, Dec. 1998, pp. 163–167.

Ultrafast Optical Switch Unveiled, Photonics Spectra, Michael Wheeler, Dec. 1998, p. 42.

Data Express, Gigabit Junction with the next–generation Internet, John Collins et al, IEEE Spectrum, Feb. 1999, pp. 18–25.

Designing Broadband Fiber Optic Communications Systems, Juan Lam, Communications Systems Design, Feb. 1999.

Terabit–transmission demonstration make a splash at OFC '96, Laser Focus World, Apr. 1996, p. 13.

Multigigabit Networks: The Challenge, Claude Rolland et al, IEEE LTS, May 1992, pp. 16–26.

Direct Detection Lightwave Systems: Why Pay More?, Paul Green et al, IEEE LCS, Nov. 1990, pp. 36–49.

Photonics in Switching, Scott Hinton, IEEE LTS, Aug. 1992, pp. 26–35.

Advanced Technology for Fiber Optic Subscriber Systems, Hiromu Taba et al, IEEE LTS, Nov. 1992, pp. 12–18.

Fiber Amplifiers Expand Network Capacities, Eric Lerner, Laser Focus World, Aug. 1997, pp. 85–96.

Technologies for Local–access Fibering, Yukou Mochida, IEEE Communications Magazine, Feb. 1994, pp. 64–72.

Wavelength Assignment in Multiphop Lightwave Networks, Aura Ganz et al, IEEE Transactions on Communications, vol. 42, No. 7, Jul. 1994, pp. 246–2469.

Wavelength–Division Switching Technology in Photonic Switching Systems, Suzuki et al, IEEE International Conference on Communications, ICC 1990, pp. 1125–1129.

Branch–Exchange Sequences for Reconfiguration of Lightwave Networks, Labourdette et al, IEEE Transactions on Communications, vol. 42, No. 10, Oct. 1994, pp. 2822–2832.

Use of Delegated Tuning and Forwarding in Wavelength Division Multiple Access Networks, Auerbach et al, IEEE Transactions on Communications, vol. 43, No. 1, Jan. 1995, pp. 52–63.

Design and Cost Performance of the Multistage WDN–PON Access Network, Guido Maier et al, Journal of Lightwave Technology, vol. 18, No. 2, Feb. 2000, pp. 125–143.

Polarization Insensitive Widely All–Optical Clock Recovery Based on AM Mode–Locking of a Fiber Ring Laser, IEEE Photonics Technology Letters, vol. 12, No. 2, Feb. 2000, pp. 211–213.

Ultra–High–Speed PLL–Type Clock Recovery Circuit Based on All–Optical Gain Modulation in Traveling–Wave Laser Diode Amplifier, Journal of Lightwave Technology, vol. 11, No. 12, Dec. 1993, pp. 2123–2129.

All–Optical Networks Need Optical Switches, Jeff Hecht, Laser Focus World, May 2000, pp. 189–196.

Photons at Work: Optical Networks on the Rise, Lee Goldberg, Electronic Design, Mar. 22, 1999, pp. 56–66.

Asynchronous Time Division Switching, Achille Pattavina, IEEE Communication Handbook, 1997, pp. 686–700.

Multiple Access Methods for Communications Networks, Izhak Rubin, IEEE Communication Handbook, 1997, pp. 622–649.

Combining Gratings and Filters Reduces WDM Channel Spacing, Pan and Shi,O ptoElectronics World, Sep. 1998, pp. S11–S17.

Picosecond–Accuracy All–Optical Bit Phase Sensing Using a Nonlinear Optical Loop Mirror, Hall et al, IEEE Photonics Technology Letters, vol. 7, No. 8, Aug. 1995, pp. 935–937.

An Ultrafast Variable Optical Delay Technique, Hall et al, IEEE Photonics Technology Letters, vol. 12, No. 2, Feb. 2000, pp. 208–210.

Prescaled 6.3 GHz clock recovery from 50 Gbits/s TDM Optical Signal with 50 GHz PLL using four–wave mixing in a traveling wave laser diode optical amplifier, Electronics Letters, May 12, 1994, vol. 30, No. 10, pp. 807–809.

Variable Optical delay line with diffraction limited Autoalignment, Klovekorn and Munch, Applied Optics, Apr. 1, 1998, vol. 37, No. 10, pp. 1903–1904.

Compact 40 Gbit/s Optical Demultiplexer using a GainAsP Optical Amplifier, Electronics Letters, Nov. 25, 1993, vol. 29, No. 24, pp. 2115–2116.

Lucent Upgrades WaveStar to 20–Channel, 800–Gb/ s Transmission; Chalmers Develops 49–dB Optical Parametric Amplifier, Photonics Spectra, Jun. 2000, p. 46.

Bit–Rate Flexible All–Optical Demultiplexing Using a Nonlinear Optical Loop Mirror, Patrick et al, Electronics Letters, Apr. 15, 1993, vol. 29, No. 8, pp. 702–703.

All–Optical High Speed Demultiplexing with a Semiconductor Laser Amplifier in a Loop Mirror Configuration, Eiselt et al, Electronics Letters, Jun. 24, 1993, vol. 29, No. 13, pp. 1167–1168.

Optical Amplifiers Revolutionize Communications, Laser Focus World, Sep. 1998, pp. 28–32.

Single Interferometer Dempltiplexes 40 Gbit/s Optical–Time–Division–Multiplexed Signal, Laser Focus World, Nov. 1999, p. 11.

Fiber–Optic Chips Multiplex 16 T1/E1 Channels Over One Cable, Electronic Design, Apr. 17, 2000, p. 46.

Analysis and Dimensioning of Switchless Networks for Single–Layer Optical Architecture, Binetti et al, Journal of Lightwave Technology, vol. 18, No. 2, Feb. 2000, pp. 144–153.

100–Gbit/s Bitwise Logic, Hall et al, MIT Lincoln Laboratory, Optics Letters, vol. 23, No. 16, Aug. 15, 1998, pp. 1271–1273.

An Optical Technique for Bit and Packet Synchronization, Blixt and Bowers, IEEE Photonics Technology Letters, vol. 7, No. 1, Jan. 1995, pp. 123–125.

Double–Spreading Modulation Scheme Picks up Where CDMA and TDMA Leave Off, Electronics Designs, pp. 28–32, Jul. 10, 2000.

Transmission of a True Single Polarisation 40 Gbit/s Soliton Data Signal Over 205km Using a Stabilised Erbium Fibre Ring Laser and 40 GHz Electronic Timing Recovery, Ellis et al , Electronics Letters, vol. 29, No. 11, pp. 990–992, May 27, 1993.

Time–Stretch Methods Capture Fast Waveforms, Jalali et al, Microwave & RF, pp. 62–69, Apr. 1999.

The Fiber–Optic Subscriber Network in Japan, Wakui, IEEE Communications Magazine, pp. 56–63, Feb. 1994.

* cited by examiner

OPTICAL SWITCHING APPARATUS AND METHODS

FIELD OF THE INVENTION

The present invention relates to optical communication networks generally, and more particularly to optical switching in optical communication networks.

BACKGROUND OF THE INVENTION

The increase of data rates carried by optical communication networks that is experienced today makes switching operations that require optical-to-electronic and electronic-to-optical conversions of communicated information undesirable. On the other hand, all-optical switching in all-optical communication networks, particularly in applications that involve wavelength division multiplexing (WDM) and in applications that require speedup and slow-down of the communicated information, is not trivial. Thus, efficient techniques for all-optical switching that supports speedup and slow-down of communicated information in non-WDM based optical communication networks and in WDM based optical communication networks are still required.

A technique that uses a delay line together with multiplexing and modulation in order to increase a data rate carried over a single fiber optic cable is described in an article entitled "Mining the Optical Bandwidth for a Terabit per Second", by Alan Eli Wiliner in IEEE Spectrum, April 1997, pp. 32–41. However, the technique described by Willner is not suitable for use with a plurality of separate fiber optic cables carrying data after the data is already modulated, and is also not suitable for use in cases where there is no synchronization between separate fiber optic cables carrying data.

Some aspects of technologies and art related to all-optical clock-recovery in optical communication networks are described in the following publications:

an article entitled "Polarization Insensitive Widely Tunable All-Optical Clock Recovery Based on AM Mode-Locking of a Fiber Ring Laser", by Wang et al in IEEE Photonics Technology Letters, Vol. 12, No. 2, February 2000, pp. 211–213;

an article entitled "Ultra-High-Speed PLL-Type Clock Recovery Circuit Based on All-Optical Gain Modulation in Traveling-Wave Laser Diode Amplifier", by Kawanishi et al in Journal of Lightwave Technology, Vol. 11, No. 12, December 1993, pp. 2123–2129; and an article entitled "Prescaled 6.3 GHz clock recovery from 50 GBit/s TDM optical signal with 50 GHz PLL using four-wave mixing in a traveling-wave laser diode optical amplifier", by Kamatani et al in Electronics Letters, Vol. 30, No. 10, May 12, 1994, pp. 807–809.

Some aspects of technologies and art related to delay line techniques are described in the following publications:

an article entitled "Variable optical delay line with diffraction-limited autoalignment" by Klovekorn et al in Applied Optics, Vol. 37, No. 10, Apr. 1, 1998, pp. 1903–1904;

an article entitled "Picosecond-Accuracy All-Optical Bit Phase Sensing Using a Nonlinear Optical Loop Mirror", by Hall et al in IEEE Photonics Technology Letters, Vol. 7, No. 8, August 1995, pp. 935–937; and an article entitled "An Ultrafast Variable Optical Delay Technique", by Hall et al in IEEE Photonics Technology Letters, Vol. 12, No. 2, February 2000, pp. 208–210.

Some aspects of technologies and art related to all-optical demultiplexing techniques are described in the following publications:

an article entitled "Compact 40 Gbit/s optical demultiplexer using a GaInAsP optical amplifier", by Ellis et al in Electronics Letters, Vol. 29, No. 24, Nov. 25, 1993, pp. 2115–2116;

an article entitled "Bit-Rate Flexible All-Optical Demultiplexing Using a Nonlinear Optical Loop Mirror", by Patrick et al in Electronics Letters, Vol. 29, No. 8, Apr. 15, 1993, pp. 702–703; and an article entitled "All-Optical High Speed Demultiplexing with a Semiconductor Laser Amplifier in a loop Mirror Configuration", by Eiselt et al in Electronics Letters, Vol. 29, No. 13, Jun. 24, 1993, pp. 1167–1168.

Some aspects of technologies and art related to WDM based and non-WDM based optical communication networks and to optical switching techniques and elements associated therewith are described in the following publications:

The Communications Handbook, CRC Press & IEEE Press, 1997, Editor-in-Chief Jerry D. Gibson, Chapter 65, pp. 883–890;

an article entitled "Optical switching promises cure for telecommunications logjam", by Jeff Hecht in Laser Focus World, September 1998, pp. 69–72;

a technology brief entitled "Lucent Upgrades Wavestar to 320-Channel, 800-Gb/s Transmission", in Photonics Spectra, June 2000, pp. 46;

an article entitled "Design and Cost Performance of the Multistage WDM-PON Access Networks", by Maier et al in Journal of Lightwave Technology, Vol. 18, No.2, February 2000, pp. 125–143;

an article entitled "All-optical networks need optical switches", by Jeff Hecht in Laser Focus World, May 2000, pp. 189–196;

an article entitled "Record Data Transmission Rate Reported at ECOC 96", by Paul Mortensen in Laser Focus World, November 1996, pp. 40–42;

an article entitled "Multiple Wavelengths Exploit Fiber Capacity", by Eric J. Lerner in Laser Focus World, July 1997, pp. 119–125;

an article entitled "Advances in Dense WDM Push Diode-Laser Design", by Diana Zankowsky in Laser Focus World, August 1997, pp. 167–172;

an article entitled "Multistage Amplifier Provides Gain Across 80 nm", by Kristin Lewotesky in Laser Focus World, September 1997, pp. 22–24;

an article entitled "WDM Local Area Networks", by Kazovsky et al in IEEE LTS, May 1992, pp. 8–15;

an article entitled "Optical Switches Ease Bandwidth Crunch", by Rien Flipse in EuroPhotonics, August/September 1998, pp. 44–45;

an article entitled "Speed Demons: Is "Faster Better and Cheaper?", by Stephanie A. Weiss in Photonics Spectra, February 1999, pp. 96–102;

an article entitled "Wavelength Lockers Keeps Lasers in Line", by Ed Miskovic in Photonics Spectra, February 1999, pp. 104–110;

an article entitled "Optical switches pursue crossconnect markets", by Hassaun Jones-Bay in Laser Focus World, May 1998, pp. 153–162;

a conference review entitled "Optical amplifiers revolutionize communications", by Gary T. Forrest in Laser Focus World, September 1998, pp. 28–32;

an article entitled "Combining gratings and filters reduces WDM channel spacing", by Pan et al in *Optoelectronics World*, September 1998, pp. S11–S17;

an article entitled "Demand triggers advances in dense WDM components", by Raymond Nering in *Optoelectronics World*, September 1998, pp. S5–S8;

an article entitled "Optical Networks Seek Reconfigurable Add/Drop Options", by Hector E. Escobar in *Photonics Spectra*, December 1998, pp. 163–167;

an article entitled "Ultrafast Optical Switch Unveiled", by Michael D. Wheeler in *Photonics Spectra*, December 1998, pp. 42;

an article entitled "Data express Gigabit junction with the next-generation Internet", by Collins et al in *IEEE Spectrum*, February 1999, pp. 18–25;

an article entitled "Designing Broadband Fiber Optic Communication Systems", by Juan F. Lam in *Communication Systems Design* magazine, February 1999, pp. 1–4 at http://www.csdmag.com;

an article entitled "Terabit/second-transmission demonstrations make a splash at OFC '96", in *Laser Focus World*, April 1996, pp. 13;

an article entitled "Multigigabit Networks: The Challenge", by Rolland et al in *IEEE LTS*, May 1992, pp. 16–26;

an article entitled "Direct Detection Lightwave Systems: Why Pay More?", by Green et al in *IEEE LCS*, November 1990, pp. 36–49;

an article entitled "Photonics in Switching", by H. Scott Hinton in *IEEE LTS*, August 1992, pp. 26–35;

an article entitled "Advanced Technology for Fiber Optic Subscriber Systems", by Toba et al in *IEEE LTS*, November 1992, pp. 12–18;

an article entitled "Fiber amplifiers expand network capacities", by Eric J. Lerner in *Laser Focus World*, August 1997, pp. 85–96;

an article entitled "Technologies for Local-Access Fibering", by Yukou Mochida in *IEEE Communications Magazine*, February 1994, pp. 64–73;

an article entitled "Wavelength Assignment in Multihop Lightwave Networks", by Ganz et al in *IEEE Transactions on Communications*, Vol. 42, No. 7, July 1994, pp. 2460–2469;

an article entitled "Wavelength-Division Switching Technology in Photonic Switching Systems", by Suzuki et al in IEEE International Conference on Communications ICC '90, pp. 1125–1129;

an article entitled "Branch-Exchange Sequences for Reconfiguration of Lightwave Networks", by Labourdette et al in *IEEE Transactions on Communications*, Vol. 42, No. 10, October 1994, pp. 2822–2832; and an article entitled "Use of Delegated Tuning and Forwarding in Wavelength Division Multiple Access Networks", by Auerbach et al in *IEEE Transactions on Communications*, Vol. 43, No. 1, January 1995, pp. 52–63.

Additionally, asynchronous time-division switching is described in *The Communications Handbook*, CRC Press & IEEE Press, 1997, Editor-in-Chief Jerry D. Gibson, Chapter 51, pp. 686–700. Multiple access methods for communications networks are described in *The Communications Handbook*, CRC Press & IEEE Press, 1997, Editor-in-Chief Jerry D. Gibson, Chapter 46, pp. 622–649

U.S. Pat. No. 5,170,273 to Nishio describes a cross-talk reducing optical switching system which receives electrical digital signals at its input terminal.

U.S. Pat. No. 5,191,457 to Yamazaki describes a WDM optical communication network in which optical beams are modulated by channel discrimination signals of different frequencies.

U.S. Pat. No. 5,194,977 to Nishio describes a wavelength division switching system with reduced optical components using optical switches.

U.S. Pat. No. 5,557,439 to Alexander et al. describes wavelength division multiplexed optical communication systems configured for expansion with additional optical signal channels.

U.S. Pat. No. 5,680,490 to Cohen et al. describes a comb splitting system which demultiplexes and/or multiplexes a plurality of optical signal channels at various wavelengths.

U.S. Pat. No. 5,712,932 to Alexander et al. describes reconfigurable wavelength division multiplexed systems which include configurable optical routing systems.

U.S. Pat. Nos. 5,724,167 and 5,739,935 to Sabella describe an optical cross-connect node architecture that interfaces plural optical fiber input and output links, each link containing plural wavelength channels.

U.S. Pat. No. 5,457,687 to Newman describes reactive congestion control in an ATM network where the network is formed by the interconnection of nodes each including a forward path for transfer of information from source to destination through the network and a return path for returning congestion control signals.

Copending U.S. patent application Ser. No. 09/126,378 filed on Jul. 30, 1998 and assigned to the assignee of the present application describes improvements in communication performance of an optical communication system that communicates data via N different channel wavelengths using WDM.

Copending U.S. patent application Ser. No. 09/389,345 filed on Sep. 3, 1999 and assigned to the assignee of the present application describes a network control system that may be embodied in various elements of a communication network that communicates optical signals multiplexed by WDM. The network control system may limit a number of channel wavelengths actually used for communicating optical signals to an end node, and control and modify data rates carried over channel wavelengths multiplexed by WDM.

The disclosures of all references mentioned above and throughout the present specification are hereby incorporated herein by reference.

SUMMARY OF THE INVENTION

The present invention seeks to improve optical switching and routing in all-optical communication networks, and particularly in wavelength division multiplexing (WDM) based optical communication networks.

In the present invention, an optical switching apparatus that is associated with a communication switch of an all-optical communication network enables speedup or slowdown of optical communication substantially without using optical-to-electronic and electronic-to-optical conversions of communicated information. In order to speedup or slowdown optical communication the optical switching apparatus combines or separates respectively series of optical signal samples representing the information by selectively using optical time-division multiplexing (OTDM) techniques and WDM techniques.

There is thus provided in accordance with a preferred embodiment of the present invention an optical switching method for switching n series of upstream optical signal samples to a destination route, each series of upstream optical signal samples in the n series of upstream optical signal samples being carried over a channel wavelength $\lambda_i$ at a data rate $DR_i$, where n is an integer and i is an index running from 1 to n, the method including the steps of optically converting the n series of upstream optical signal samples into a combined series of upstream optical signal samples having the upstream optical signal samples carried over a channel wavelength $\lambda_D$ at a combined data rate $DR_c$ which is greater than any separate $DR_i$, the channel wavelength $\lambda_D$ being useful for carrying optical signal samples to the destination route, and routing the combined series of upstream optical signal samples to the destination route. Preferably, $DR_c$ is one of the following: equal to $\Sigma_{i=1,...,n} DR_i$, and similar to $\Sigma_{i=1,...,n} DR_i$.

The optically converting step preferably includes converting any of the $\lambda_i$ that differ from $\lambda_D$ to $\lambda_D$ thereby forming a group of n series of upstream optical signal samples having the upstream optical signal samples carried over $\lambda_D$, and combining the n series of upstream optical signal samples in the group so as to provide the combined series of upstream optical signal samples.

Preferably, the upstream optical signal samples in each of the n series of upstream optical signal samples are spaced by a time spacing T, and the combining step includes recovering a clock signal $CLK_i$ for each series of upstream optical signal samples in the group, generating time delays of at least a fraction of T between every two series of upstream optical signal samples in the group so as to create a group of n sequentially delayed series of upstream optical signal samples in which a delay between every two series of upstream optical signal samples is at least a fraction of T, and multiplexing the n sequentially delayed series of upstream optical signal samples in the group so as to provide the combined series of upstream optical signal samples.

The multiplexing step preferably includes multiplexing the n sequentially delayed series of upstream optical signal samples in the group by using synchronous time-division multiplexing when $DR_1=,...,=DR_n$, and multiplexing the n sequentially delayed series of upstream optical signal samples in the group by using asynchronous time-division multiplexing when at least some of the data rates $DR_1,...,DR_n$ are different from each other.

Preferably, the destination route includes at least one of the following: a destination fiber optic cable capable of carrying optical signal samples at the combined data rate $DR_c$, a wireless communication route, a waveguide, a transmission line, an interface to a destination optical transceiver, and an interface to a destination optical communication system operating at the combined data rate $DR_c$.

In a case where the n series of upstream optical signal samples are coded in a line code other than a return-to-zero (RZ) line code, the method also includes converting the n series of upstream optical signal samples coded in the line code other than an RZ line code into n series of RZ coded upstream optical signal samples prior to the optically converting step, and converting the combined series of upstream optical signal samples into a combined series of upstream optical signal samples coded in the line code other than an RZ line code after the optically converting step.

Preferably, the method also includes the step of selecting the channel wavelength $\lambda_D$ prior to the optically converting step.

The method may also preferably include, prior to the optically converting step, the steps of selecting the n series of upstream optical signal samples from groups of $k_1,...,k_m$ series of upstream optical signal samples that are respectively carried over m separate fiber optic cables in a wavelength division multiplexed form over channel wavelengths $\{\lambda_{iijj}\}$ at data rates $\{DR_{iijj}\}$ respectively, where $k_1,...,k_m$ are integers greater than one, m is an integer greater than or equal to one, ii is an index running from 1 to m, and jj is an index running from 1 to $k_j$ where j is an index running from 1 to m, and dropping the n series of upstream optical signal samples from those of the m separate fiber optic cables that carry the n series of upstream optical signal samples.

Preferably, the dropping step includes demultiplexing at least those of the groups of $k_1,...,k_m$ series of upstream optical signal samples that include the n series of upstream optical signal samples so as to provide LK demultiplexed series of upstream optical signal samples, where LK is an integer greater than one, and selecting each of the n series of upstream optical signal samples from the LK demultiplexed series of upstream optical signal samples.

There is also provided in accordance with a preferred embodiment of the present invention an optical switching method for switching a series of downstream optical signal samples which is carried over a channel wavelength $\lambda_T$ at a data rate $DR_T$ to nn routes, where nn is an integer greater than one, the method including the steps of optically converting the series of downstream optical signal samples into nn series of downstream optical signal samples having the downstream optical signal samples carried over channel wavelengths $\lambda_1,...,\lambda_{nn-1}, \lambda_T$ at data rates $DRT_1,...,DRT_{nn}$ respectively, where $\lambda_1 \# \lambda_T,...,\lambda_{nn-1} \# \lambda_T$ and each of $DRT_1,...,DRT_{nn}$ is less than $DR_T$, and routing the nn series of downstream optical signal samples to the nn routes respectively.

Preferably, the optically converting step includes separating the series of downstream optical signal samples so as to provide a group of nn series of downstream optical signal samples having the optical signal samples in each series of downstream optical signal samples in the group carried over $\lambda_T$ at a respective one of the data rates $DRT_1,...,DRT_{nn}$, and converting $\lambda_T$ of all except one of the series of downstream optical signal samples in the group into the channel wavelengths $\lambda_1,...,\lambda_{nn-1}$ so as to provide the nn series of downstream optical signal samples having the downstream optical signal samples carried over the channel wavelengths $\lambda_1,...,\lambda_{nn-1}, \lambda_T$ at the respective data rates $DRT_1,...,DRT_{nn}$.

The separating step preferably includes using synchronous time-division demultiplexing for separating the series of downstream optical signal samples so as to provide the group of nn series of downstream optical signal samples in which $DRT_1=,...,=DRT_{nn}$, and using asynchronous time-division demultiplexing for separating the series of downstream optical signal samples so as to provide the group of nn series of downstream optical signal samples in which at least some of the data rates $DRT_1,...,DRT_n$ are different from each other.

Additionally, the method also includes the step of selecting the channel wavelengths $\lambda_1,...,\lambda_{nn-1}$ prior to the optically converting step.

Further in accordance with a preferred embodiment of the present invention there is also provided an optical communication signal useful for communication to at least one of a node server and an end node of an optical communication network, the optical communication signal including a series of optical signal samples having the optical signal samples carried over a channel wavelength $\lambda_D$ at a data rate $DR_c$, the series of optical signal samples being produced by optically converting n series of optical signal samples in which the optical signal samples are respectively carried over channel wavelengths $\lambda_1, \ldots, \lambda_n$ at data rates $DR_1, \ldots, DR_n$, where n is an integer and $DR_c$ is greater than any one of $DR_1, \ldots, DR_n$.

In accordance with yet another preferred embodiment of the present invention there is also provided an optical switching apparatus for switching n series of upstream optical signal samples to a destination route, each series of upstream optical signal samples in the n series of upstream optical signal samples being carried over a channel wavelength $\lambda_i$ at a data rate $DR_i$, where n is an integer and i is an index running from 1 to n, the optical switching apparatus including an upstream optical converter unit operative to convert the n series of upstream optical signal samples into a combined series of upstream optical signal samples having the upstream optical signal samples carried over a channel wavelength $\lambda_D$ at a combined data rate $DR_c$ which is greater than any separate $DR_i$, the channel wavelength $\lambda_D$ being useful for carrying optical signal samples to the destination route, and a upstream router operatively associated with the upstream optical converter unit and operative to route the combined series of upstream optical signal samples to the destination route.

Additionally, the optical switching apparatus may also preferably include a controller operatively associated with the upstream optical converter unit and operative to perform at least one of the following: to determine the number n of series of upstream optical signal samples, and to select the channel wavelength $\lambda_D$.

Preferably, the upstream optical converter unit includes an upstream wavelength converter unit operative to convert any of the $\lambda_i$ that differ from $\lambda_D$ to $\lambda_D$ thereby forming a group of n series of upstream optical signal samples having the upstream optical signal samples carried over $\lambda_D$, and a combiner operatively associated with the upstream wavelength converter unit and operative to combine the n series of upstream optical signal samples in the group so as to provide the combined series of upstream optical signal samples.

The upstream optical signal samples in each of the n series of upstream optical signal samples are preferably spaced by a time spacing T, and the combiner preferably includes a clock-recovery unit operative to recover a clock signal $CLK_i$ for each series of optical signal samples in the group, an optical delay mechanism operatively associated with the clock-recovery unit and operative to generate time delays of at least a fraction of T between every two series of upstream optical signal samples in the group so as to create a group of n sequentially delayed series of upstream optical signal samples in which a delay between every two series of upstream optical signal samples is at least a fraction of T, and a multiplexer operatively associated with the optical delay mechanism and operative to multiplex the n sequentially delayed series of upstream optical signal samples in the group so as to provide the combined series of upstream optical signal samples.

Preferably, the multiplexer includes at least one of the following: a synchronous time-division multiplexer, and an asynchronous time-division multiplexer.

Additionally, the apparatus may also preferably include, for use in a case where the n series of upstream optical signal samples are coded in a line code other than an RZ line code, a line code converter unit operatively associated with the upstream optical converter unit and the upstream router and operative to convert the n series of upstream optical signal samples coded in the line code other than an RZ line code into n series of RZ coded upstream optical signal samples prior to conversion of the n series of upstream optical signal samples into the combined series of upstream optical signal samples in the upstream optical converter unit, and to convert the combined series of upstream optical signal samples into a combined series of upstream optical signal samples coded in the line code other than an RZ line code after conversion of the n series of upstream optical signal samples into the combined series of upstream optical signal samples in the upstream optical converter unit.

Preferably, the controller, or an additional controller that may be included in the optical switching apparatus and operatively associated with the upstream optical converter unit, is operative to select the n series of upstream optical signal samples from groups of $k_1, \ldots, k_m$ series of upstream optical signal samples that are respectively carried over m separate fiber optic cables in a wavelength division multiplexed form over channel wavelengths $\{\lambda_{iijj}\}$ at data rates $\{DR_{iijj}\}$ respectively, where $k_1, \ldots, k_m$, are integers greater than one, m is an integer greater than or equal to one, ii is an index running from 1 to m, and jj is an index running from 1 to $k_j$ where j is an index running from 1 to m, and a multiplexing/demultiplexing unit operatively associated with the upstream optical converter unit and the controller and operative to drop the n series of upstream optical signal samples selected by the controller from those of the m separate fiber optic cables that carry the n series of upstream optical signal samples. The multiplexing/demultiplexing unit preferably includes at least one add drop multiplexer (ADM).

The optical switching apparatus may preferably be embodied in a communication switch of a communication network that includes a node server and a plurality of end nodes and may preferably be operatively associated with the node server and the plurality of end nodes.

There is also provided in accordance with still another preferred embodiment of the present invention an optical switching apparatus for switching a series of downstream optical signal samples which is carried over a channel wavelength $\lambda_T$ at a data rate $DR_T$ to nn routes, where nn is an integer greater than one, the optical switching apparatus including a downstream optical converter unit operative to optically convert the series of downstream optical signal samples into nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$ respectively, where $\lambda_1 \# \lambda_T, \ldots, \lambda_{nn-1} \# \lambda_T$ and each of $DRT_1, \ldots, DRT_{nn}$ is less than $DR_T$, and a downstream router operatively associated with the downstream optical converter unit and operative to route the nn series of downstream optical signal samples to the nn routes respectively.

Preferably, the downstream optical converter unit includes a demultiplexer operative to separate the series of downstream optical signal samples so as to provide a group of nn series of downstream optical signal samples having the optical signal samples in each series of downstream optical signal samples in the group carried over $\lambda_T$ at a respective one of the data rates $DRT_1, \ldots, DRT_{nn}$, and a downstream wavelength converter unit operatively associated with the demultiplexer and operative to convert $\lambda_T$ of all except one of the series of downstream optical signal samples in the group into the channel wavelengths $\lambda_1, \ldots, \lambda_{nn-1}$, so as to provide the nn series of downstream optical signal samples having the downstream optical signal samples carried over the channel wavelengths $\lambda_1, \ldots, \lambda_{nn-1}, \lambda_T$ at the respective data rates $DRT_1, \ldots, DRT_{nn}$.

The optical switching apparatus may preferably be embodied in a communication switch of a communication network that includes a node server and a plurality of end nodes and may preferably be operatively associated with the node server and the plurality of end nodes.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
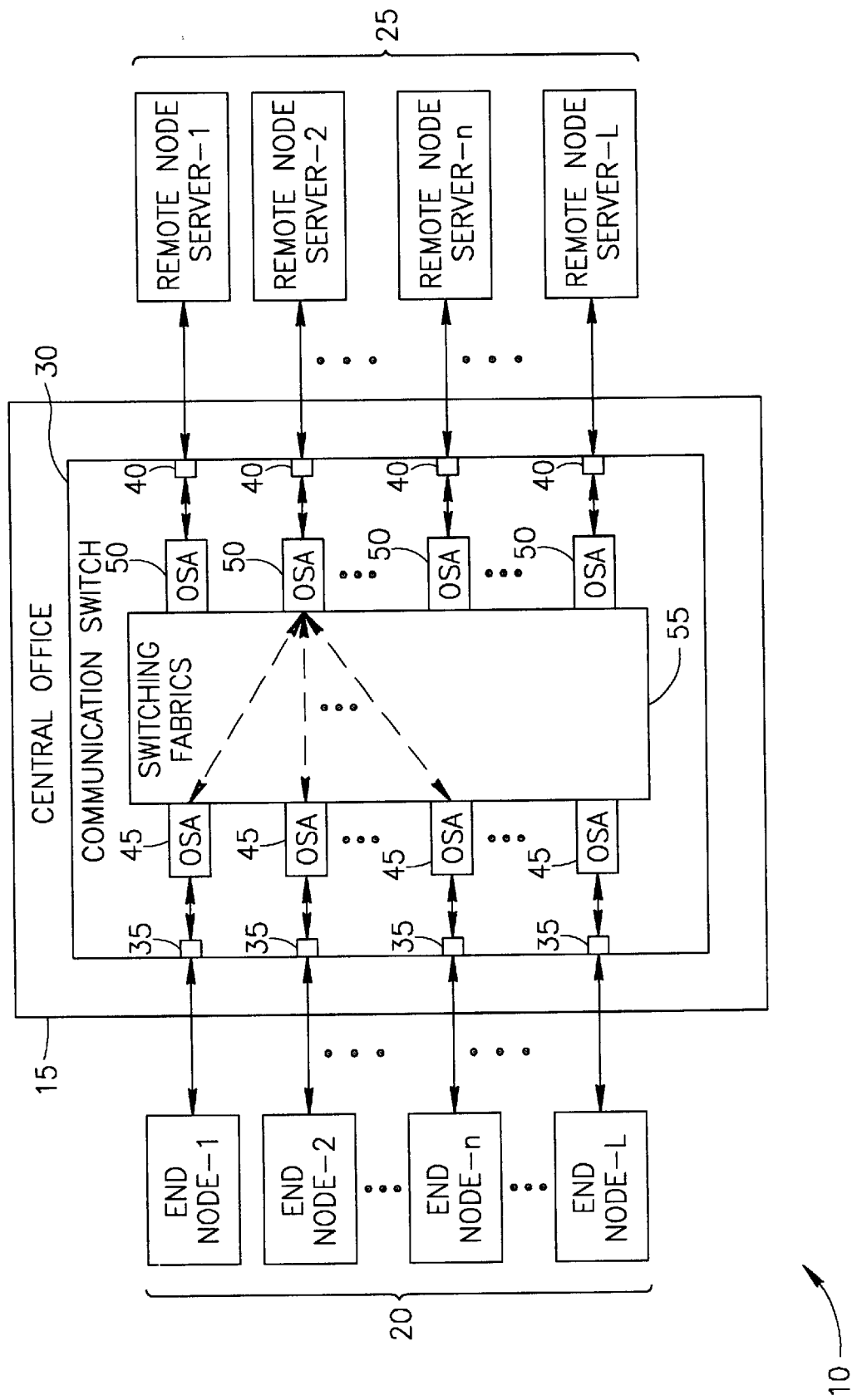
FIG. 1 is a simplified block diagram illustration of a preferred implementation of an optical communication network, the optical communication network being constructed and operative in accordance with a preferred embodiment of the present invention.

Reference is now made to FIG. 1 which is a simplified block diagram illustration of a preferred implementation of an optical communication network 10, the optical communication network 10 being constructed and operative in accordance with a preferred embodiment of the present invention.

The optical communication network 10 preferably includes a plurality of node servers that communicate, preferably in two-way communication, with a plurality of end nodes.

The term "node server" is used throughout the specification and claims to include a network element at a branch or a node of a communication network which concentrates, switches and/or routes information transmitted from other branches of the communication network that are associated with it. The term "end node" is used throughout the specification and claims to include a network element at a branch or anode of a communication network that communicates with other network elements via a node server.

It is appreciated that node servers and end nodes may be located at various branches or nodes of an optical communication network. Referring, for example, to a communication path between an information provider unit and a subscriber terminal, the information provider unit is a node server to the subscriber terminal, and the subscriber terminal is an end node to the information provider unit. If communication between the information provider unit and the subscriber terminal is provided via an intermediate element of the optical communication network, for example an optical network unit (ONU), then the ONU is an end node to the information provider unit, and a node server to the subscriber terminal. Similarly, in a multi-stage communication network in which communication between the information provider unit and the subscriber terminal is provided via a series of intermediate elements, an intermediate element at any stage is a node server for intermediate elements at lower stages, and an end node for intermediate elements at higher stages.

In a communication system that forms part of an optical data storage system, a node server may include a concentrator that concentrates data communicated in wired or wireless communication from one of the following: a storage media, a plurality of optical data sources; and optical data conveyors. The storage media, the plurality of optical data sources and the optical data conveyors are end nodes to the concentrator.

Typically, a node server may communicate with a single end node or with a plurality of end nodes, and with other node servers. An end node may communicate with a single node server or with a plurality of node servers, and with other end nodes via one or more node servers. It is appreciated that the present invention is not limited by the number of end nodes that communicate with a single node server, or by the number of node servers that communicate with a single end node.

In the embodiment shown in FIG. 1, a central office (CO) 15 of the optical communication network 10 is a node server that preferably communicates in two-way optical communication with a plurality of end nodes 20 and a plurality of node servers 25. The plurality of end nodes 20 preferably include L end nodes 20, and the plurality of node servers 25 preferably include L node servers 25 that are located away from the CO 15. The CO 15 preferably includes a communication switch 30 that is operative to switch and route optical information communicated via the switch 30 in the following way: from the plurality of end nodes 20 to the plurality of node servers 25 and vice versa; from end nodes 20 to other end nodes 20; and from node servers 25 to other node servers 25.

The switch 30 may preferably include an L×L optical switch having L input ports 35 and L output ports 40. Each of the input ports 35 is preferably operatively associated with one of the L end nodes 20 and with an optical switching apparatus (OSA) 45. Each of the output ports 40 is preferably operatively associated with one of the L node servers 25 and with an optical switching apparatus (OSA) 50 that may be similar in structure and functionality to the OSA 45. Each of the OSAs 45 and the OSAs 50 is preferably operatively associated with switching fabrics 55 that may include, for example, an optical cross-connect (not shown) as is well known in the art, for example, from the article entitled "Optical switching promises cure for telecommunications logjam", by Jeff Hecht, Laser Focus World, September 1998 that is mentioned above. It is appreciated that the OSAs 45 and 50 may alternatively or additionally be comprised in the switching fabrics 55.

The operation of the optical communication network 10 of FIG. 1 is now briefly described. Preferably, the switch 30 switches and routes optical information communicated by the end nodes 20 and the node servers 25. Each of the end nodes 20 and each of the node servers 25 may preferably communicate the optical information over one channel wavelength or over a plurality of channel wavelengths, for example, in a wavelength division multiplexed form.

In conventional optical switching, optical information received at, for example, one of the input ports 35 is switched to one of the output ports 40. In a preferred embodiment of the present invention each of the OSAs 45 and the OSAs 50 is preferably capable of combining optical information from a plurality of ports, such as a plurality of input ports 35 or a plurality of output ports 40. The OSAs 45 and the OSAs 50 are also preferably capable of routing combined optical information in a suitable format to a single port, such as a single output port 40 or a single input port 35. Additionally or alternatively, each of the OSAs 45 and the OSAs 50 is capable of separating optical information received at a single port and distributing separated optical information to a plurality of ports in a suitable format. Accordingly, the OSAs 45 the OSAs 50 enable the switch 30 to speedup or slowdown optical information passing through the switch 30.

It is appreciated that the OSAs 45 and 50 need not necessarily be comprised in the switch 30. In a case where the switch 30 is a conventional switch with no speedup or slowdown functionality, the OSAs 45 and 50 may provide, for example, pre-switching combination of optical information before it is inputted to the switch 30, or post-switching combination of optical information outputted by the switch 30.

It is appreciated that although communication speedup is known in communication networks that communicate electronic data signals, that is communication networks operating in the electronic domain, speedup in optical communication networks that operate in the optical domain to transmit optical signals is not trivial. The present invention however provides for speedup and slow-down of optical communication in all-optical networks. The term "all-optical network" is used throughout the specification and claims to include an optical communication network in which switching operations requiring conversions from the optical domain to the electronic domain and vice versa are avoided, at least to a certain extent.

Figure 2:
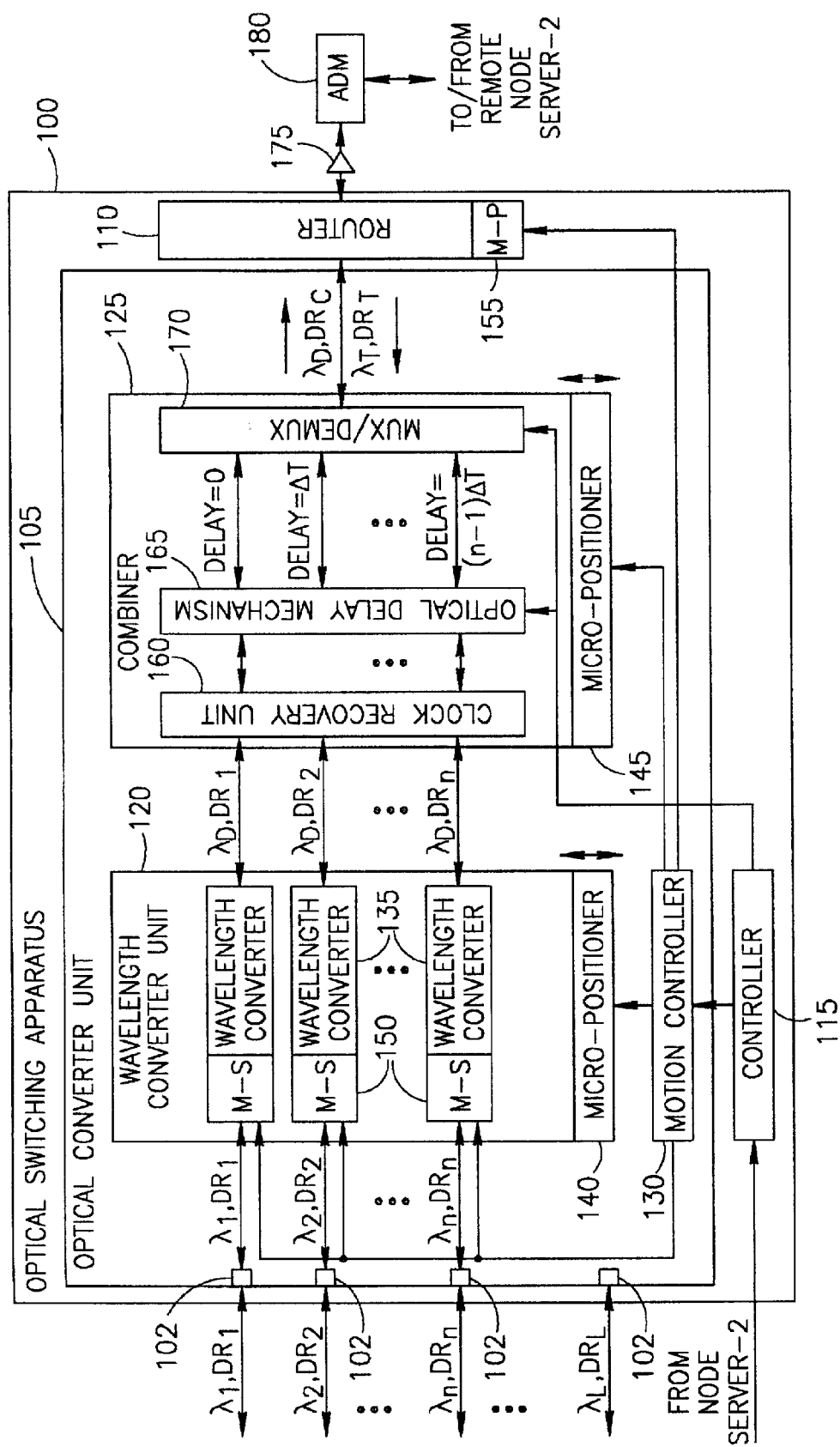
FIG. 2 is a simplified block diagram illustration of a preferred implementation of an optical switching apparatus in the optical communication network of FIG. 1, the optical switching apparatus being constructed and operative in accordance with a preferred embodiment of the present invention.

Reference is now additionally made to FIG. 2 which is a simplified block diagram illustration of a preferred implementation of one of the OSAs 45 and 50 in the optical communication network 10 of FIG. 1. For simplicity, the description below refers to one of the OSAs 50 shown in FIG. 1 to be operatively associated with one of the plurality of remote node servers 25 that is indicated as remote node server-2. The OSA 50 that is shown in FIG. 1 to be operatively associated with the remote node server-2 is referred to in FIG. 2 as optical switching apparatus 100.

It is appreciated that the present invention is not limited by referring to the optical switching apparatus 100 and its association with the remote node server-2 because, as mentioned above, all the OSAs 45 and 50 are similar in structure and functionality.

The remote node server-2 may be, for example a CO (not shown) located in a city (not shown) away from the CO 15, and both the remote node server-2 and the CO 15 may form part of a metropolitan area network (MAN) (not shown). The optical switching apparatus 100 in the CO 15 may then interface to the MAN and enable the CO 15 to communicate with the remote node server-2 via the MAN.

The optical switching apparatus 100 preferably switches and routes optical signal samples communicated in a direction upstream and in a direction downstream. The term "upstream" is used throughout the specification and claims to refer to a direction of communication towards one of the plurality of node servers 25, such as towards the remote node server-2. The term "downstream" is used throughout the specification and claims to refer to a direction of communication towards one of the plurality of end nodes 20. Thus, for example, upstream communication may include transmission of optical information from some of the end nodes 20 to the remote node server-2 as well as transmission of optical information from remote node servers 25 other than the remote node server-2 to the remote node server-2 via the switch 30. Downstream communication may include, for example, transmission of optical information from the remote node server-2 to some of the end nodes 20 as well as transmission of optical information from one of the end nodes 20 to other end nodes 20 via the switch 30.

The optical signal samples switched and routed by the optical switching apparatus 100 may be either analog optical signals or digital optical signals that represent optical information. If the optical signal samples are digital optical signals, each optical signal sample typically includes a bit. Preferably, the optical signal samples are coded in a return-to-zero (RZ) line code with adjacent optical signal samples being spaced by time spacing T. However, it is appreciated that the optical signal samples may alternatively be coded in other line codes as described below.

Referring for example, to communication in the upstream, the optical switching apparatus 100 may preferably receive n series of upstream optical signal samples, where n is an integer greater than one. Each series of upstream optical signal samples in the n series of upstream optical signal samples is preferably carried over a channel wavelength $\lambda_i$ at a data rate $DR_i$, where i is an index running from 1 to n. It is appreciated that each series of upstream optical signal samples in the n series of upstream optical signal samples may carry optical signal samples in an optical time-division multiplexed form.

The optical switching apparatus 100 may preferably include L ports 102, where L is an integer greater than one, and the n series of upstream optical signal samples are preferably received at the optical switching apparatus 100 via n of the L ports 102. Preferably, the n series of upstream optical signal samples received via the n ports 102 are provided to an optical converter unit 105 that is preferably comprised in the optical switching apparatus 100. It is appreciated that the optical converter unit 105 may preferably operate as an upstream optical converter unit for upstream communication as well as a downstream optical converter unit for downstream communication.

The optical converter unit 105 is preferably operative to convert the n series of upstream optical signal samples into a combined series of upstream optical signal samples having the upstream optical signal samples carried over a channel wavelength $\lambda_D$ at a combined data rate $DR_c$ which is greater than any separate $DR_i$. The channel wavelength $\lambda_D$ is preferably a channel wavelength that is useful for carrying optical signal samples to a destination route. The destination route, which preferably guides the optical signal samples, for example, to the remote node server-2, may include one of the following communication media: a fiber optic cable capable of carrying optical signal samples at the combined data rate $DR_c$, a wireless communication route; a waveguide other than a fiber optic cable; a transmission line; an interface to an optical transceiver; and an interface to an optical communication system operating at the combined data rate $DR_c$. The term "transceiver" is used throughout the specification and claims to include a transmitter and a receiver, preferably combined together.

Preferably, the optical converter unit 105 provides the combined series of upstream optical signal samples to a router 110 that is also preferably comprised in the optical switching apparatus 100. The router 110 is preferably operative to route the combined series of upstream optical signal samples to the destination route at the combined data rate $DR_c$. It is appreciated that $DR_c$ may preferably be equal to $\Sigma_{i=1,\ldots,n} DR_i$ or similar to $\Sigma_{i=1,\ldots,n} DR_i$.

Preferably, the optical switching apparatus 100 may also include a controller 115 that is operatively associated with the optical converter unit 105 and is operative to determine the number of series n converted by the optical converter unit 105 and combined in the combined series of upstream optical signal samples. It is appreciated that the controller 115 may be also operative to select the channel wavelength $\lambda_D$, preferably from $\lambda_1, \ldots, \lambda_n$ and optionally, in response to an instruction received, for example, from the remote node server-2.

The optical converter unit 105 may preferably include a wavelength converter unit 120, a combiner 125 and a motion controller 130. The wavelength converter unit 120 preferably includes a plurality of wavelength converters 135. The plurality of wavelength converters 135 are preferably operative to convert any channel wavelength $\lambda_i$ that differs from $\lambda_D$ to $\lambda_D$ thereby forming a group of n series of upstream optical signal samples having the upstream optical signal samples carried over $\lambda_D$.

Preferably, the wavelength converter unit 120 provides the group of n series of upstream optical signal samples having the upstream optical signal samples carried over $\lambda_D$ to the combiner 125 which is operative to combine the n series of upstream optical signal samples in the group so as to provide the combined series of upstream optical signal samples having the upstream optical signal samples carried over $\lambda_D$ at the combined data rate $DR_c$ that is provided by the router 110 to the destination route.

The motion controller 130 is preferably operative to control motion of the wavelength converter unit 120 and the combiner 125. Motion backward or forward of the wavelength converter unit 120 and the combiner 125 is preferably provided by micro-positioners (M-Ps) 140 and 145 that are preferably coupled to the wavelength converter unit 120 and combiner 125 respectively. The micro-positioners 140 and 145 are preferably operative to move the wavelength converter unit 120 and the combiner 125 in synchronization under control of the motion controller 130.

It is appreciated that the controller 115 may also have the functionality of the motion controller 130 in which case the motion controller 130 is optional.

Preferably, each of the plurality of wavelength converters 135 may be associated with an ON/OFF switch, such as a mechanical switch (M-S) 150. When an M-S 150 is in the "ON" state, the M-S 150 passes optical signal samples to a wavelength converter unit 135 associated therewith. When the M-S 150 is in the "OFF" state, passage of optical signal samples to the wavelength converter 135 that is associated with the M-S 150 is blocked. Preferably, the motion controller 130 is also operative to control operation of the M-Ss 150.

The router 110 may preferably be coupled to a micro-positioner 155 that is operative to move the router 110 backward or forward. The motion controller 130 is preferably operatively associated with the micro-positioner 155 and is operative to control the micro-positioner 155. The router 110 is preferably moved in synchronization with the wavelength converter unit 120 and the combiner 125.

It is appreciated that motion of the wavelength converter unit 120, the combiner 125 and the router 110 and operation of the M-Ss 150 may be required in various applications. For example, in a pre-switching or a post-switching application, the wavelength converter unit 120 and the combiner 125 may be moved backward or forward in order to receive series of optical signal samples from different end nodes 20.

Furthermore, the optical switching apparatus 100 may be required to combine different numbers of series of optical signal samples depending on the capacity of the remote node server 25 that is associated with the optical switching apparatus 100. In such a case, selection of the number n of series of optical signal samples to be combined by the optical switching apparatus 100 may be performed by programming the motion controller 130 to provide a suitable combination of M-Ss 150 in ON states that allow passage of series of upstream optical signal samples and M-Ss 150 in OFF states that block passage of series of upstream optical signal samples. The programming of the motion controller 130 may be performed, for example, in response to an indication received from the remote node server 25 that is associated with the optical switching apparatus 100.

The combiner 125 may preferably include a clock-recovery unit 160, an optical delay mechanism 165 and a multiplexer/demultiplexer (MUX/DEMUX) 170. The clock-recovery unit 160 is preferably operative to receive the group of n series of upstream optical signal samples having the upstream optical signal samples carried over $\lambda_D$ from the wavelength converters 135 and to recover a clock signal $CLK_i$ for each series of optical signal samples in the group.

Preferably, the clock-recovery unit 160 is operative to perform all-optical clock recovery for each of the series in the group. An example of a system that performs all-optical clock recovery is a system described in the above-mentioned article of Wang et al that performs all-optical clock recovery based on AM mode-locking of a fiber ring laser. Another example of a system that performs all-optical clock recovery is a system described in the above-mentioned article of Kawanishi et al that performs all-optical clock recovery based on a phase-locked-loop (PLL). It is appreciated that the clock-recovery unit 160 may include more than one of the systems of Wang et al or Kawanishi et al in order to recover the clock signals of all the series in the group.

Once the clock signals of the series of upstream optical signal samples in the group have been recovered by the clock recovery unit 160, the optical delay mechanism 165, which is preferably operatively associated with the clock-recovery unit 160, may generate time delays of at least a fraction of the time spacing T between every two series of upstream optical signal samples in the group so as to create a group of n sequentially delayed series of upstream optical signal samples in which a delay between every two series of upstream optical signal samples is at least a fraction of T.

The optical delay mechanism 165 may include, for example, a plurality of delay generators which delay optical signals without using optical-to-electronic and electronic-to-optical conversions as described in copending U.S. patent application Ser. No. 09/389,345 filed on Sep. 3, 1999. The optical delay mechanism 165 may use, for example, a signal phase discriminator (not shown) to sense phase variations between the series of optical signal samples, and the controller 115, or a controller comprised in the optical delay mechanism 165 (not shown), may select, based on sensed phase variations between the series of optical signal samples, delay generators to be used by the optical delay mechanism 165 so as to ultimately provide the following series of time delays: $0, \Delta T, 2\Delta T, 3\Delta T, \ldots, (n-1)\Delta T$, where $\Delta T$ is the fraction of T.

Alternatively, the optical delay mechanism 165 may generate the series of time delays using, for example, a delay line setup as described in the above-mentioned article of Klovekorn et al or arrangements that use a nonlinear optical loop mirror (NOLM) as described in the above-mentioned articles of Hall et al.

The optical delay mechanism 165 preferably provides the group of n sequentially delayed series of upstream optical signal samples to the MUX/DEMUX 170. The MUX/DEMUX 170 may include, for example, a passive star coupler (not shown) that multiplexes the n sequentially delayed series of upstream optical signal samples in the group so as to provide the combined series of upstream optical signal samples which is provided to the router 110 and fed by the router 110 to the destination route. It is appreciated that due to the delay between the series of upstream optical signal samples, multiplexing by the MUX/DEMUX 170 ultimately results in a combined series of upstream optical signal samples having the upstream optical signal samples multiplexed by optical time-division multiplexing (OTDM).

It is appreciated that the combined series of upstream optical signal samples may be amplified by an optical amplifier 175, such as an Erbium-doped-fiber-amplifier (EDFA) for wavelengths around 1550 nanometer (nm), before feeding to the destination route. The optical amplifier 175 may be comprised in the optical switching apparatus 100 or associated therewith. It is appreciated that optical amplifiers (not shown) may also be operatively associated with the wavelength converters 135 and the clock-recovery unit 160.

Preferably, in order to prevent overlapping of the optical signal samples multiplexed by the MUX/DEMUX 170, ΔT must be less than T minus WD, where WD is a characteristic duration of an optical signal sample in the n series of upstream optical signal samples. Additionally or alternatively, the highest delay between any two series of upstream optical signal samples in the group of n sequentially delayed series of upstream optical signal samples should not exceed T minus WD. It is appreciated that the ratio T/WD, which is preferably computed by the controller 115, determines the number n of series of upstream optical signal samples that can be combined in the combined series of upstream optical samples. The controller 115 preferably determines n to be the highest integer that satisfies the inequality n<T/WD.

In a case where $DR_1=, \ldots, =DR_n$, the controller 115 may select delay generators or delay line setups to provide a series of time delays growing by a constant step. In such a case, the MUX/DEMUX 170 may include a synchronous time-division multiplexer which is operative to synchronously time-division multiplex the n sequentially delayed series of upstream optical signal samples in the group so as to provide the combined series of upstream optical signal samples.

In a case where at least some of the data rates $DR_1, \ldots, DR_n$ are different from each other, the controller 115 may select delay generators or delay line setups to provide a series of variably growing time delays. In such a case, the MUX/DEMUX 170 may include an asynchronous time-division multiplexer which is operative to asynchronously time-division multiplex the n sequentially delayed series of upstream optical signal samples in the group so as to provide the combined series of upstream optical signal samples.

It is appreciated that at least the multiplexer portion of the MUX/DEMUX 170, the router 110 and the destination route may be comprised in a single element. For example, in a case where the optical switching apparatus 100 communicates with the remote node server-2 via a fiber optic cable (not shown), a star coupler (not shown) may be used as a combination of the multiplexer portion of the MUX/DEMUX 170, the router 110 and the destination route since a fused fiber portion of the star coupler that is coupled to n ports of the star coupler may form part of all of the multiplexer portion of the MUX/DEMUX 170, the router 110 and the destination route.

The destination route may be operatively associated with an add/drop multiplexer (ADM) 180. The ADM 180 is preferably operative to multiplex by wavelength division multiplexing (WDM) the upstream optical signal samples in the combined series of upstream optical signal samples having the upstream optical signal samples carried over $\lambda_D$ at the combined data rate $DR_c$ with optical signal samples multiplexed by WDM that may be provided to the ADM 180, for example, from OSAs 50 other than the optical switching apparatus 100 or from other information sources (not shown) external to the CO 15. It is appreciated that the ADM 180 may preferably be separated from the optical switching apparatus 100 or alternatively embodied in the router 110 and associated with the destination route.

The term "wavelength division multiplexing" or "WDM" is used throughout the specification and claims in a broad sense to include wavelength division multiplexing of optical signals carried over a plurality of channel wavelengths within any suitable wavelength range. Specifically, WDM is used throughout the specification and claims to include wavelength division multiplexing of optical signals carried over two channel wavelengths, wavelength division multiplexing of optical signals carried over more than two and up to tens of channel wavelengths for which the term "dense WDM" (DWDM) is typically used, and wavelength division multiplexing of optical signals carried over tens to hundreds of channel wavelengths for which the term "optical frequency division multiplexing" (OFDM) is typically used. Channel wavelengths typically used for WDM include wavelengths in bands of the order of tens nm around each of the following wavelengths: 780 nm; 980 nm; 1310 nm; 1480 nm; 1550 nm; and 1620 nm. It is appreciated that optical signals carried over channel wavelengths in different wavelength bands may also be multiplexed by WDM.

Referring now to communication in the downstream, the ADM 180 may preferably drop a series of downstream optical signal samples carried over a channel wavelength $\lambda_T$ at a data rate $DR_T$ that is communicated by the remote node server-2 to the optical switching apparatus 100. It is appreciated that the series of downstream optical signal samples may be carried over the channel wavelength $\lambda_T$ in a time-division multiplexed form.

Preferably, the optical switching apparatus 100 may receive the series of downstream optical signal samples at the router 110. The router 110 preferably provides the series of downstream optical signal samples to the optical converter unit 105 which is preferably operative to convert the series of downstream optical signal samples into nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$ respectively, where nn is an integer greater than one, $\lambda_1 \neq \lambda_T, \ldots, \lambda_{nn-1} \neq \lambda_T$ and each of $DRT_1, \ldots, DRT_{nn}$ is less than $DR_T$. It is appreciated that $DRT_1, \ldots, DRT_{nn}$ are determined so as to preferably satisfy the equality $\Sigma_{i=1,\ldots,nn} DRT_i = DR_T$ or so that $\Sigma_{i=1,\ldots,nn} DRT_i$ is similar to $DR_T$.

Preferably, the optical converter unit 105 provides the nn series of downstream optical signal samples having the downstream optical signal samples carried over the channel wavelengths $\lambda_1, \ldots, \lambda_{nn-1}, \lambda_T$ at the data rates $DRT_1, \ldots, DRT_{nn}$ to the switching fabrics 55 which functions, for this purpose, as a router that routes the nn series of downstream optical signal samples to nn appropriate destinations, such as nn of the L end nodes 20.

It is appreciated that in symmetric communication applications $DRT_i = DR_u$ for corresponding downstream and upstream series of optical signal samples. In asymmetric communication applications $DRT_i \neq DR_i$ for at least some of the corresponding downstream and upstream series of optical signal samples.

The number nn of series of downstream optical signal samples may preferably be determined by the controller 115, and selected, for example, by the controller 115 instructing the motion controller 130 to provide a suitable combination of M-Ss 150 in ON states and M-Ss 150 in OFF states. The controller 115 may additionally be operative to select the channel wavelengths $\lambda_1, \ldots, \lambda_{nn-1}$ prior to conversion of the series of downstream optical signal samples into the nn series of downstream optical signal samples.

Preferably, conversion of the series of downstream optical signal samples into the nn series of downstream optical signal samples is performed by the optical converter unit 105 as follows: the MUX/DEMUX 170 preferably performs optical time-division demultiplexing of the series of downstream optical signal samples so as to provide a group of nn series of downstream optical signal samples, each having the optical signal samples carried over $\lambda_T$ at a corresponding one of the data rates $DRT_1, \ldots, DRT_{nn}$. The group of nn series of optical signal samples is then provided to the wavelength converter unit 120.

At the wavelength converter unit 120, the wavelength converters 135 preferably convert $\lambda_T$ of all except one of the series of downstream optical signal samples in the group into the channel wavelengths $\lambda_1, \ldots, \lambda_{nn-1}$ so as to provide the nn series of downstream optical signal samples having the downstream optical signal samples carried over the channel wavelengths $\lambda_1, \ldots, \lambda_{nn-1}, \lambda_T$ at the respective data rates $DRT_1, \ldots, DRT_{nn}$. Then, the wavelength converters 135 provide the nn series of downstream optical signal samples having the downstream optical signal samples carried over the channel wavelengths $\lambda_1, \ldots, \lambda_{nn-1}, \lambda_T$ at the data rates $DRT_1, \ldots, DRT_{nn}$ to the switching fabrics 55.

For the purpose of performing optical time-division demultiplexing of the series of downstream optical signal samples even, for example, at data rates of the order of tens Gbit/sec, the demultiplexer portion of the MUX/DEMUX 170 may include a setup as described, for example, in the article of Ellis et al with different switching windows for each series of downstream optical signal samples in the group. Alternative setups that may be suitable for the demultiplexer portion of the MUX/DEMUX 170 are described in the above mentioned articles of Eiselt et al and Patrick et al. It is appreciated that the setups of Ellis et al, Eiselt et al and Patrick et al use built-in setups for clock-recovery and for creating tunable switching windows in which case the clock-recovery unit 160 and the optical delay mechanism 165 do not participate in downstream communication.

In a case where the MUX/DEMUX 170 includes a synchronous time-division demultiplexer which performs synchronous optical time-division demultiplexing of the series of downstream optical signal samples, the resulting data rates $DRT_1, \ldots, DRT_{nn}$ of the nn series of downstream optical signal samples are equal. In a case where the MUX/DEMUX 170 includes an asynchronous time-division demultiplexer which performs asynchronous optical time-division demultiplexing of the series of downstream optical signal samples, at least some of the resulting data rates $DRT_1, \ldots, DRT_{nn}$ of the nn series of downstream optical signal samples are not equal.

The operation of the apparatus of FIG. 2 is now briefly described by referring, without limiting the present invention, to an example in which four end nodes 20 communicate simultaneously with the remote node server-2 via the optical switching apparatus 100.

In communication in a direction upstream, four series of upstream optical signal samples originating from the four end nodes 20 and carried over channel wavelengths $\lambda_1, \lambda_2, \lambda_3, \lambda_4$ at data rates $DR_1, DR_2, DR_3,$ and $DR_4$ respectively are provided by the switching fabrics 55 to the optical switching apparatus 100. Each of the data rates $DR_1, DR_2, DR_3,$ and $DR_4$ may be, for example, equal to 2.5 Gbit/sec. The optical signal samples in each of the four series of upstream optical signal samples are preferably multiplexed by OTDM, and each of the four series of upstream optical signal samples is preferably coded in an RZ line code with adjacent optical signal samples being spaced by a time spacing T.

At the optical switching apparatus 100, the controller 115 preferably selects the channel wavelength $\lambda_D$ to be, for example, $\lambda_1$. Then, the wavelength converters 135 preferably convert each of the channel wavelengths $\lambda_2, \lambda_3, \lambda_4$ into $\lambda_1$ thereby forming a group of four series of upstream optical signal samples having the upstream optical signal samples carried over $\lambda_1$.

Preferably, the group of four series of upstream optical signal samples having the upstream optical signal samples carried over $\lambda_1$ is provided to the combiner 125. At the combiner 125, the clock signals for the four series of upstream optical signal samples are preferably recovered and time delays of T/4, T/2 and 3T/4 are preferably respectively generated between the series of upstream optical signal samples in the group so as to form a group of four sequentially delayed series of upstream optical signals having the upstream optical signal samples carried over $\lambda_1$.

The four sequentially delayed series of upstream optical signal samples in the group are preferably time-division multiplexed, in this case synchronously, thereby providing a combined series of upstream optical signal samples which carries optical signal samples over the channel wavelength $\lambda_1$ at a combined data rate of 10 Gbit/sec. The combined series of upstream optical signal samples may be routed via the destination route, for example, to the remote node server-2.

It is thus appreciated that the operation of the optical switching apparatus 100 resulted in a speedup of optical communication in the upstream by a factor of four. Such speedup may be required, for example, in a case where the end nodes 20 and the remote node servers 25 communicate with the CO 15 at different data rates. This may occur, for example, when the remote node servers 25 and the end nodes 20 include different generations of communication hardware.

In communication in a direction downstream, the optical switching apparatus 100 receives from the remote node server-2 a series of downstream optical signal samples that are carried, for example, over a channel wavelength $\lambda_T = \lambda_1$ at a data rate $DR_T = 10$ Gbit/sec. The series of downstream optical signal samples is preferably provided to the combiner 125.

At the combiner 125, one of the techniques mentioned above for performing time-division demultiplexing of the series of downstream optical signal samples may be used to recover the clock signal of the series of downstream optical signal samples and to apply different switching windows so as to obtain, for example by synchronous time-division demultiplexing, nn=4 series of downstream optical signal samples, each having the optical signal samples carried at 2.5 Gbit/sec over $\lambda_1$.

The four series of downstream optical signal samples having the optical signal samples carried at 2.5 Gbit/sec over $\lambda_1$ are then provided to the wavelength converter unit 120 in which the channel wavelengths $\lambda_1$ of three of the four series of downstream optical signal samples are preferably converted into $\lambda_2, \lambda_3, \lambda_4$ respectively so as to ultimately provide four series of downstream optical signal samples having the downstream optical signal samples carried over the channel wavelengths $\lambda_1, \lambda_2, \lambda_3$ and $\lambda_4$ at data rates $DRT_1$, $DRT_2$, $DRT_3$ and $DRT_4$, where $DRT_1=DRT_2=DRT_3=DRT_4=2.5$ Gbit/sec.

The four series of downstream optical signal samples having the downstream optical signal samples carried over the channel wavelengths $\lambda_1, \lambda_2, \lambda_3$ and $\lambda_4$ at the data rates $DRT_1$, $DRT_2$, $DRT_3$ and $DRT_4$ may then be provided to the switching fabrics 55. The switching fabrics 55 may route the four series of downstream optical signal samples having the downstream optical signal samples carried over the channel wavelengths $\lambda_1, \lambda_2, \lambda_3$ and $\lambda_4$ at the data rates $DRT_1$, $DRT_2$, $DRT_3$ and $DRT_4$ to the four end nodes 20 respectively. It is thus appreciated that the operation of the optical switching apparatus 100 resulted in a slow-down of optical communication in the downstream by a factor of four.

Figure 3:
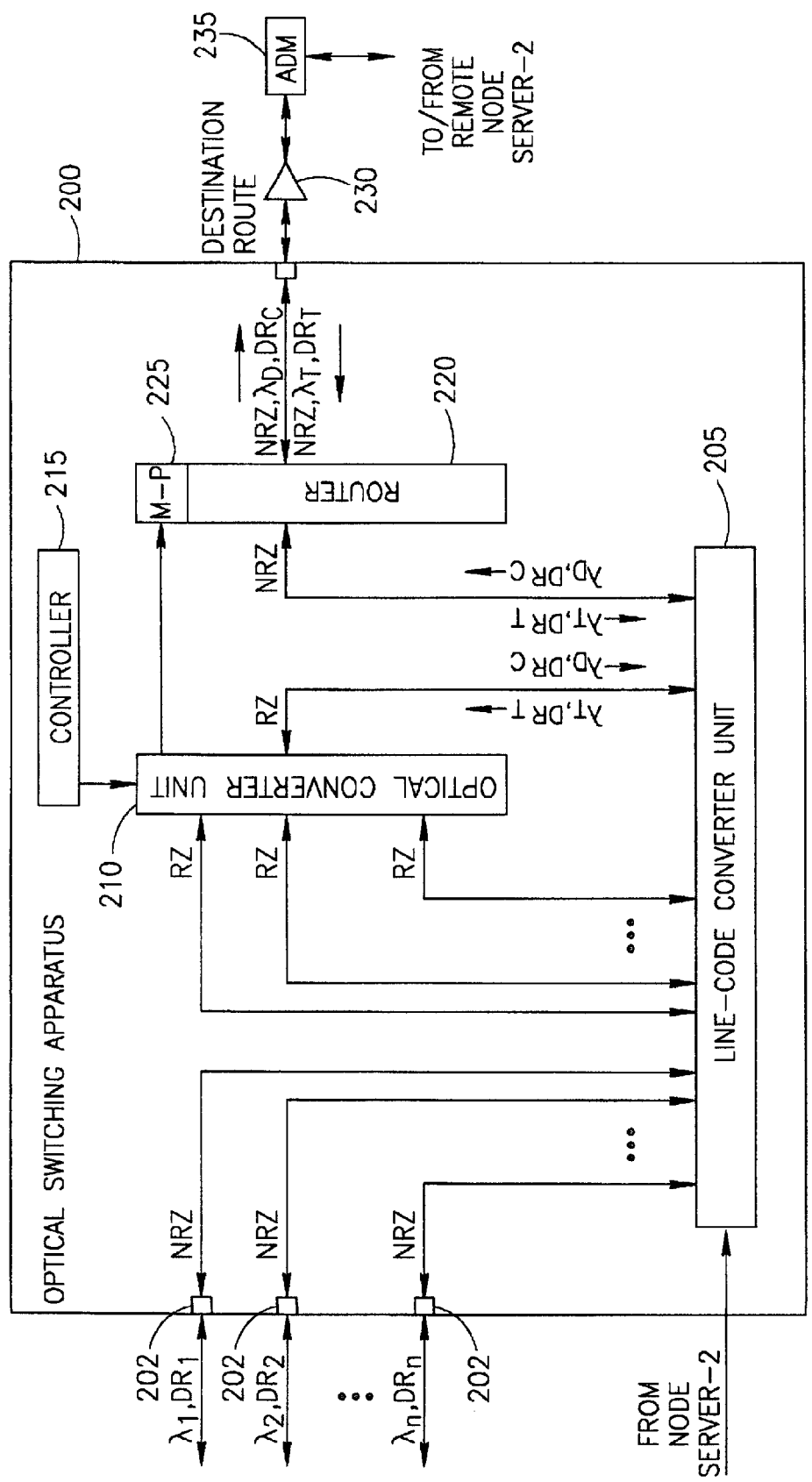
FIG. 3 is a simplified block diagram illustration of another preferred implementation of an optical switching apparatus in the optical communication network of FIG. 1.

Reference is now made to FIG. 3 which is a simplified block diagram illustration of a preferred implementation of an optical switching apparatus 200 in the optical communication network 10 of FIG. 1. The optical switching apparatus 200 may preferably replace the optical switching apparatus 100 of FIG. 2 in applications in which optical signal samples communicated to and from the optical switching apparatus 200 are coded in a line code other than an RZ line code. The line code other than an RZ line code may be, for example, a non-return-to zero (NRZ) line code.

Referring for example to communication in the upstream, the optical switching apparatus 200 may preferably receive n series of NRZ coded upstream optical signal samples via ports 202, where n is an integer. Each of the n series of NRZ coded upstream optical signal samples is preferably carried over a channel wavelength $\lambda_i$ at a data rate $DR_i$, where i is an index running from 1 to n.

Preferably, the n series of NRZ coded upstream optical signal samples are provided to a line code converter unit 205 that is operatively associated with the optical switching apparatus 200 and may also be comprised in the optical switching apparatus 200. The line code converter unit 205 is preferably operative to convert the n series of NRZ coded upstream optical signal samples into n series of RZ coded upstream optical signal samples.

In its simplest form, the line converter unit 205 may include a conventional transceiver of RZ coded optical signal samples (not shown) that is operatively associated with a conventional transceiver of NRZ coded optical signal samples (not shown). For conversion of optical signal samples from an NRZ line code to an RZ line code, NRZ coded optical signal samples, that are received and decoded at the receiver portion of the transceiver of NRZ coded optical signal samples, are encoded in an RZ line code and transmitted by the transmitter portion of the transceiver of RZ coded optical signal samples. For conversion of optical signal samples from an RZ line code to an NRZ line code, RZ coded optical signal samples, that are received and decoded at the receiver portion of the transceiver of RZ coded optical signal samples, are encoded in an NRZ line code and transmitted by the transmitter portion of the transceiver of NRZ coded optical signal samples.

It is appreciated that the line code converter unit 205 may receive indications of the type of the line code other than an RZ line code to be used from the remote node server-2 of FIG. 1 and apply transceivers of optical signal samples coded in corresponding line codes.

Preferably, the n series of RZ coded upstream optical signal samples are provided to an optical converter unit 210 that may be similar in structure and functionality to the optical converter unit 105 of FIG. 2. At the optical converter unit 210, the n series of RZ coded upstream optical signal samples are converted into a combined series of RZ coded upstream optical signal samples having the upstream optical signal samples carried over a channel wavelength $\lambda_D$ at a combined data rate $DR_c$ in a manner as mentioned above with reference to FIG. 2. It is appreciated that the optical converter unit 210 may be controlled by a controller 215 that may be similar in structure and functionality to the controller 115 of FIG. 2.

Preferably, the optical converter unit 210 provides the combined series of RZ coded upstream optical signal samples back to the line code converter unit 205 which preferably converts the combined series of RZ coded upstream optical signal samples into a combined series of NRZ coded upstream optical signal samples. Then, the line code converter unit 205 preferably provides the combined series of NRZ coded upstream optical signal samples to a router 220 that may be similar in structure and functionality to the router 110 of FIG. 2 and may similarly be moved by a micro-positioner (M-P) 225 that may be controlled via the optical converter unit 210. The router 220 may preferably route the combined series of NRZ coded upstream optical signal samples to a destination route which preferably provides the combined series of NRZ coded upstream optical signal samples, preferably after amplification by an optical amplifier 230, to an ADM 235.

The ADM 235 may preferably be similar in structure and functionality to the ADM 180 of FIG. 2. The ADM 235 is preferably operative to multiplex by WDM the NRZ coded upstream optical signal samples in the combined series of NRZ coded upstream optical signal samples with optical signal samples multiplexed by WDM that may be provided to the ADM 235, for example, from information sources (not shown) external to the optical switching apparatus 200. The output of the ADM 235 is preferably provided to the remote node server-2 of FIG. 1. It is appreciated that the ADM 235 is preferably separated from the optical switching apparatus 200 or alternatively embodied in the router 220 and associated with the destination route.

In a direction downstream, a series of NRZ coded downstream optical signal samples carried over a channel wavelength $\lambda_T$ at a data rate $DR_T$ is preferably provided to the line code converter unit 205 via the router 220. The line code converter unit 205 preferably converts the series of NRZ coded downstream optical signal samples into a series of RZ coded downstream optical signal samples that is preferably separated, in the optical converter unit 210, so as to provide nn series of RZ coded downstream optical signal samples having the downstream optical signal samples carried over channel wavelengths $\lambda_1, \ldots, \lambda_{nn-1}, \lambda_T$ at data rates $DRT_1, \ldots, DRT_{nn}$ in a manner as mentioned above with reference to FIG. 2. The nn series of RZ coded downstream optical signal samples are then provided to the line code converter unit 205 which preferably converts the nn series of RZ coded downstream optical signal samples into nn series of NRZ coded downstream optical signal samples. The nn series of NRZ coded downstream optical signal samples are then preferably routed, for example, to the switching fabrics 55 of FIG. 1.

Figure 4:
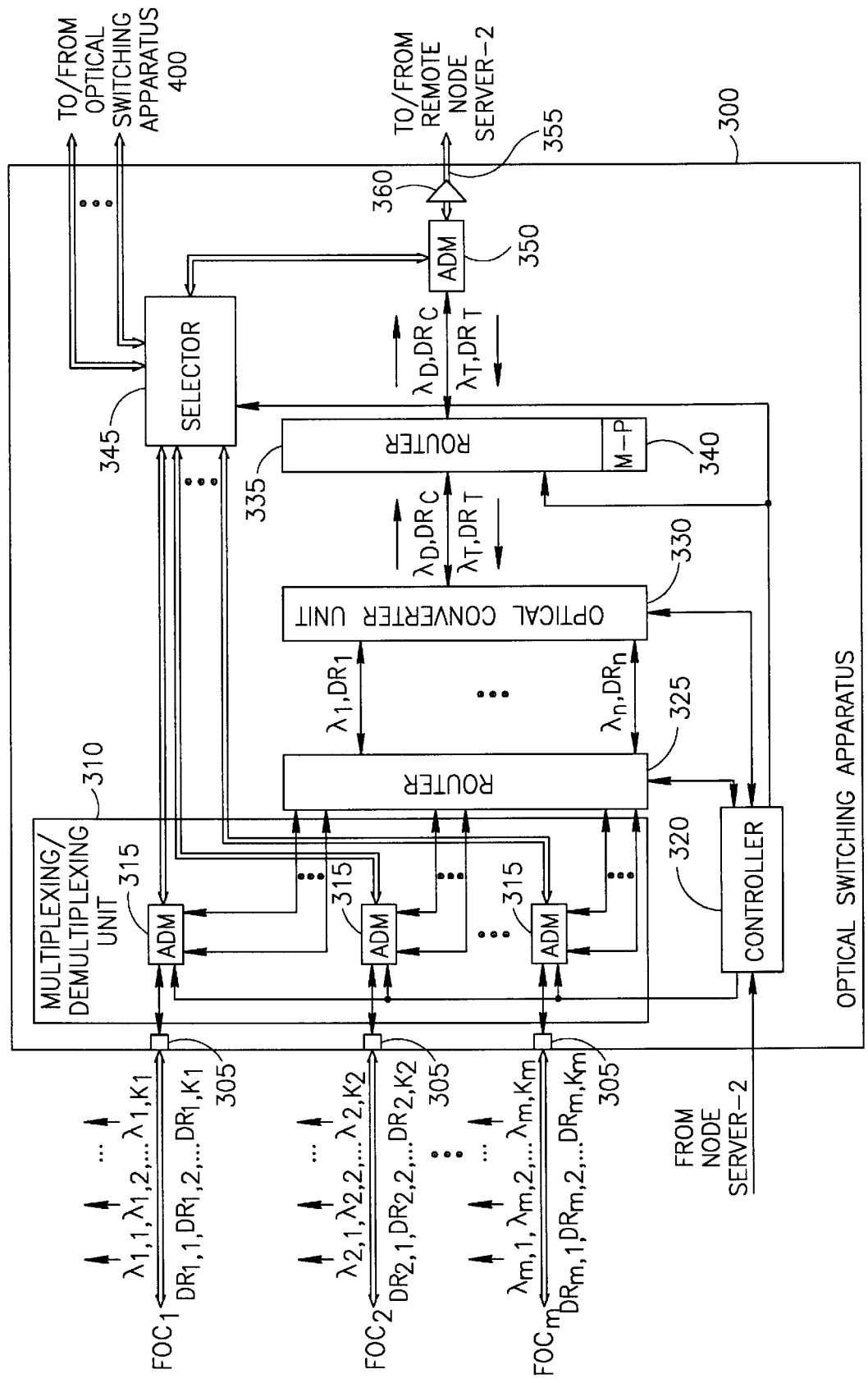
FIG. 4 is a simplified block diagram illustration of yet another preferred implementation of an optical switching apparatus in the optical communication network of FIG. 1.

Reference is now made to FIG. 4 which is a simplified block diagram illustration of a preferred implementation of an optical switching apparatus 300 in the optical communication network 10 of FIG. 1. The optical switching apparatus 300 may preferably replace the optical switching apparatus 100 of FIG. 2 in applications in which optical signal samples communicated to and from the optical switching apparatus 300 are provided in a wavelength division multiplexed form.

Referring for example to communication in the upstream, the optical switching apparatus 300 may preferably receive at ports 305 a plurality of series of upstream optical signal samples. The plurality of series of upstream optical signal samples are preferably received from the switching fabrics 55 of FIG. 1 via separate waveguides, such as via m separate fiber optic cables $FOC_1, FOC_2, \ldots, FOC_m$, where m is an integer greater than or equal to 1. Preferably, the fiber optic cables $FOC_1, FOC_2, \ldots, FOC_m$ carry groups of $k_1, \ldots, k_m$ series of upstream optical signal samples respectively, preferably in a wavelength division multiplexed form over channel wavelengths $\{\lambda_{iijj}\}$ at data rates $\{DR_{iijj}\}$ respectively, where $k_1, \ldots, k_m$ are integers greater than one, ii is an index running from 1 to m, and jj is an index running from 1 to $k_j$ where j is an index running from 1 to m.

Preferably, the plurality of series of optical signal samples received at the ports 305 are provided to a multiplexing/demultiplexing unit 310 in the optical switching apparatus 300 that may preferably be a WDM multiplexing/demultiplexing unit. The multiplexing/demultiplexing unit 310 may include one ADM 315 or a plurality of ADMs 315. Alternatively, the multiplexing/demultiplexing unit 310 may include one wavelength division multiplexer/demultiplexer such as a star coupler/decoupler (not shown) or a plurality of wavelength division multiplexers/demultiplexers (not shown).

The multiplexing/demultiplexing unit 310 is preferably operatively associated with a controller 320 and a router 325 that are preferably comprised in the optical switching apparatus 300. The controller 320 and the router 325 are also preferably operatively associated with an optical converter unit 330 that may also be comprised in the optical switching apparatus 300 and may be similar in structure and functionality to the optical converter unit 105 of FIG. 2. The optical converter unit 330 is also preferably operatively associated with a router 335 and a micro-positioner 340 associated with router 335. The router 335 and the micro-positioner 340 may be comprised in the optical switching apparatus 300 and may be similar in structure and functionality to the router 110 and the micro-positioner 155 of FIG. 2 respectively.

Preferably, the controller 320 may be operative to control operation of the ADMs 315 in the multiplexing/demultiplexing unit 310, the router 325 and the optical converter unit 330. It is appreciated that the controller 320 may receive inputs from the remote node server-2 of FIG. 1 and control operation of the ADMs 315, the router 325 and the optical converter unit 330 based, for example, on the inputs received from the remote node server-2 of FIG. 1. Alternatively, the controller may be pre-programmed or programmed to operate independently of the remote node server-2.

It is appreciated that the controller 320 may also have the functionality of a controller (not shown) in the optical converter unit 330 that corresponds to the controller 115 of FIG. 2 in which case the controller in the optical converter unit 330 is optional.

Preferably, the controller 320 is operative to select n series of upstream optical signal samples from the groups of $k_1, \ldots, k_m$ series of upstream optical signal samples. The controller 320 may select the n series of upstream optical signal samples, for example, from a group of series of upstream optical signal samples carried over one of the fiber optic cables $FOC_1, FOC_2, \ldots, FOC_m$ or from a plurality of groups of series of upstream optical signal samples carried over a plurality of the fiber optic cables $FOC_1, FOC_2, \ldots, FOC_m$ respectively. It is appreciated that the number n of series of upstream optical signal samples may be selected, for example, in accordance with a capacity of the remote node server-2.

Preferably, based on a selection of n series of upstream optical signal samples performed by the controller 320, the ADMs 315 drop the n series of upstream optical signal samples selected by the controller 320 from those of the m separate fiber optic cables $FOC_1, FOC_2, \ldots, FOC_m$ that carry the selected n series of upstream optical signal samples.

It is appreciated that in a case where the multiplexing/demultiplexing unit 310 includes wavelength division multiplexer/demultiplexers, the n series of upstream optical signal samples may be separated by demultiplexing at least some of the $k_1, \ldots, k_m$ series of upstream optical signal samples in the groups of $k_1, \ldots, k_m$ series of upstream optical signal samples so as to provide LK demultiplexed series of upstream optical signal samples, where LK is an integer greater than one and less than or equal to $m*(k_1 + \ldots + k_m)$, and selecting each of the n series of upstream optical signal samples from the LK demultiplexed series of upstream optical signal samples.

The n series of upstream optical signal samples dropped or separated by the multiplexing/demultiplexing unit 310 are preferably provided to the router 325 which preferably arranges and routes the n series of upstream optical signal samples to n ports (not shown) of the optical converter unit 330. The optical converter unit 330 and the router 335 preferably operate in a manner as mentioned above with reference to FIG. 2 to combine the n series of upstream optical signal samples, using OTDM, so as to provide, at the output of the router 335, a combined series of upstream optical signal samples having the upstream optical signal samples carried over a channel wavelength $\lambda_D$ at a combined data rate $DR_c$. The router 335 preferably provides the combined series of upstream optical signal samples to an ADM 350 that may be comprised in the optical switching apparatus 300 or operatively associated therewith.

Preferably, series of upstream optical signal samples that are not provided to the router 325 are provided, for example over at least some of the m separate fiber optic cables $FOC_1, FOC_2, \ldots, FOC_m$, to a selector 345 that may be comprised in the optical switching apparatus 300 and controlled by the controller 320. The selector 345 may include, for example, a mechanical switch (not shown) that selects one of the fiber optic cables $FOC_1, FOC_2, \ldots, FOC_m$ under control of the controller 320 and outputs series of upstream optical signal samples that are carried over a selected fiber optic cable to the ADM 350, and series of upstream optical signal samples that are carried over non-selected fiber optic cables to a separate optical switching apparatus 400 (not shown) that may be similar in structure and functionality to the optical switching apparatus 300. The optical switching apparatus 400 may operate together with the optical switching apparatus 300 in a cascaded form as described below.

The ADM 350 preferably employs WDM to add the combined series of upstream optical signal samples having the upstream optical signal samples carried over $\lambda_D$ to series of upstream optical signal samples that are carried over the fiber optic cable selected by the selector 345 in a wavelength division multiplexed form thereby generating a combined series of upstream optical signal samples, combined by both OTDM and WDM. Then, the ADM 350 transmits the combined series of upstream optical signal samples, combined by both OTDM and WDM, to the remote node server-2 of FIG. 1 via a destination fiber optic cable 355, preferably after amplification by an optical amplifier 360.

In a direction downstream, a group of series of downstream optical signal samples multiplexed by WDM that is transmitted from the remote node server-2 of FIG. 1 is preferably received at the ADM 350 in the optical switching apparatus 300. It is appreciated that each series of downstream optical signal samples in the group preferably carries the optical signal samples at a data rate $DR_T$.

Preferably, the ADM 350 separates a series of downstream optical signal samples carried over a channel wavelength $\lambda_T$ at the data rate $DR_T$ from the group and provides the separated series of downstream optical signal samples to the router 335. The ADM 350 also preferably provides the rest of the series of downstream optical signal samples in the group, that are carried over channel wavelengths other than $\lambda_T$, to the selector 345.

The selector 345 preferably provides the series of downstream optical signal samples received there at to at least one of the ADMs 315 selected by the controller 320, for example the ADM 315 that is operatively associated with the fiber optic cable $FOC_2$. The router 335 preferably provides the series of downstream optical signal samples carried over the channel wavelength $\lambda_T$ at the data rate $DR_T$ to the optical converter unit 330. The optical converter unit 330 preferably separates, in a manner as mentioned above with reference to FIG. 2, the series of downstream optical signal samples carried over the channel wavelength $\lambda_T$ at the data rate $DR_T$ so as to provide nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$.

Then, in accordance with a selection performed by the controller 320, the nn series of downstream optical signal samples are preferably provided to nn ADMs 315 including, for example, the ADM 315 that is operatively associated with the fiber optic cable $FOC_2$. The ADM 315 that is operatively associated with the fiber optic cable $FOC_2$ preferably adds, using WDM, a corresponding one of the nn series of downstream optical signal samples to the series of downstream optical signal samples provided thereto by the selector 345 and routes outputted series of upstream optical signal samples multiplexed by WDM to the fiber optic cable $FOC_2$. The other nn−1 ADMs 315 may, for example, route the nn−1 corresponding series of downstream optical signal samples to the fiber optic cables $FOC_1, FOC_3, \ldots, FOC_{nn}$ respectively.

It is thus appreciated that by employing the optical switching apparatus 300, series of downstream optical signal samples multiplexed by WDM may be separated and recombined to provide, for example, various distributions in which the same fiber optic cable may carry series of downstream optical signal samples at different data rates.

The operation of the apparatus of FIG. 4 is now briefly described by referring, without limiting the present invention, to a few examples.

In a first example, the optical switching apparatus 300 may receive eight series of upstream optical signal samples for routing to the node server-2. A first fiber optic cable $FOC_1$ preferably carries four of the eight series of upstream optical signal samples to the optical switching apparatus 300 in a wavelength division multiplexed form over channel wavelengths $\lambda_1, \lambda_2, \lambda_3$ and $\lambda_4$ at corresponding data rates $DR_1, DR_2, DR_3$ and $DR_4$, where $DR_1=DR_2=DR_3=DR_4=2.5$ Gbit/sec. A second fiber optic cable $FOC_2$ preferably carries the other four series of upstream optical signal samples to the optical switching apparatus 300 in a wavelength division multiplexed form over channel wavelengths $\lambda_5, \lambda_6, \lambda_7$ and $\lambda_8$ at corresponding data rates $DR_5, DR_6, DR_7$ and $DR_8$ where $DR_5=DR_6=DR_7=DR_8=2.5$ Gbit/sec.

The upstream series of optical signal samples carried over $FOC_1$ and $FOC_2$ can be combined by using WDM, as is well known in the art, so as to provide eight series of upstream optical signal samples multiplexed by WDM and carried over $\lambda_1, \ldots, \lambda_8$ at corresponding data rates $DR_1, \ldots, DR_8$, where $DR_1=, \ldots, =DR_8=2.5$ Gbit/sec.

However, the remote node server-2 may include, for example, equipment that can communicate with the optical switching apparatus 300 at a higher data rate over each channel wavelength, such as at 10 Gbit/sec, but can allot less channel wavelengths for communication with the optical switching apparatus 300, for example five channel wavelengths. In such a case, the optical switching apparatus 300 may perform, under control of the controller 320, a combination using OTDM in the optical converter unit 330 of the four series of upstream optical signal samples carried over $\lambda_1, \lambda_2, \lambda_3$ and $\lambda_4$ so as to provide a combined series of upstream optical signal samples having the optical signal samples carried over $\lambda_1$ at a data rate $DR_c$, where $DR_c=10$ Gbit/sec.

The other four series of upstream optical signal samples carried over $\lambda_5, \lambda_6, \lambda_7$ and $\lambda_8$ may preferably be provided unchanged, via the multiplexing/demultiplexing unit 310 and the selector 345, to the ADM 350. The ADM 350 may use WDM to add the combined series of upstream optical signal samples having the optical signal samples carried over $\lambda_1$ to the four series of upstream optical signal samples carried over $\lambda_5, \lambda_6, \lambda_7$ and $\lambda_8$ so as to provide five series of upstream optical signal samples multiplexed by WDM and carried over $\lambda_1, \lambda_5, \lambda_6, \lambda_7$ and $\lambda_8$, where the series of upstream optical signal samples carried over $\lambda_1$ is carried at 10 Gbit/sec, and each of the other four series of upstream optical signal samples is carried at 2.5 Gbit/sec. The five series of upstream optical signal samples are preferably routed to the remote node server-2.

It is appreciated that the optical switching apparatus 300 may perform alternative combinations of the eight series of upstream optical signal samples received there at depending, for example, on criteria and constraints received from the remote node server-2 or determined by the controller 320.

One type of criteria and constraints that may be determined by the controller 320 may include, for example, occurrence of interference effects between different channel wavelengths. Referring, for example, to a case where interference effects occur between the channel wavelengths $\lambda_2$ and $\lambda_6$, conventional WDM of the eight channel wavelengths $\lambda_1, \ldots, \lambda_8$ is not desirable. However, when the optical switching apparatus 300 is used to provide the five series of upstream optical signal samples multiplexed by WDM and carried over $\lambda_1, \lambda_5, \lambda_6, \lambda_7$ and $\lambda_8$, such interference effects are avoided.

In a second example, the optical switching apparatus 300 also receives eight series of upstream optical signal samples for routing to the node server-2, but the eight series of upstream optical signal samples are provided at different data rates. A first fiber optic cable $FOC_1$ preferably carries four of the eight series of upstream optical signal samples to the optical switching apparatus 300 in a wavelength division multiplexed form over channel wavelengths $\lambda_1$, $\lambda_2$, $\lambda_3$ and $\lambda_4$ at corresponding data rates $DR_1$, $DR_2$, $DR_3$ and $DR_4$, where $DR_1=DR_3=10$ Gbit/sec and $DR_2=DR_4=2.5$ Gbit/sec. A second fiber optic cable $FOC_2$ preferably carries the other four series of upstream optical signal samples to the optical switching apparatus 300 in a wavelength division multiplexed form over channel wavelengths $\lambda_5$, $\lambda_6$, $\lambda_7$ and $\lambda_8$ at corresponding data rates $DR_5$, $DR_6$, $DR_7$ and $DR_8$, where $DR_5=DR_7=10$ Gbit/sec and $DR_6=DR_8=2.5$ Gbit/sec.

The optical switching apparatus 300 may preferably perform, under control of the controller 320, a combination using OTDM in the optical converter unit 330 of the series of upstream optical signal samples carried over $\lambda_2$, $\lambda_4$, $\lambda_6$ and $\lambda_8$ so as to provide a combined series of upstream optical signal samples having the optical signal samples carried at a data rate $DR_c=10$ Gbit/sec, for example over $\lambda_2$. The combined series of upstream optical signal samples may then be provided to the ADM 350.

The series of upstream optical signal samples carried over $\lambda_1$, $\lambda_3$, $\lambda_5$ and $\lambda_7$ may preferably be provided unchanged, via the multiplexing/demultiplexing unit 310 and the selector 345, to the ADM 350. The ADM 350 preferably combines the series of upstream optical signal samples carried over $\lambda_1$, $\lambda_3$, $\lambda_5$ and $\lambda_7$ with the combined series of upstream optical signal samples having the optical signal samples carried over $\lambda_2$ by using WDM so as to transmit to the remote node server-2 five series of upstream optical signal samples having the upstream optical signal samples carried over $\lambda_1$, $\lambda_2$, $\lambda_3$, $\lambda_5$ and $\lambda_7$ at similar data rates of 10 Gbit/sec.

In a third example, series of upstream optical signal samples may be combined in a plurality of combination stages by employing the optical switching apparatus 300 in a cascaded form together with the optical switching apparatus 400 or a plurality thereof. In each stage, the controller 320 or a corresponding controller (not shown) in one of the plurality of optical switching apparatus 400 may determine the series of upstream optical signal samples to be combined and whether to perform combination by utilizing OTDM and/or WDM.

It is appreciated that in each of the examples mentioned above, series of downstream optical signals that are transmitted in a direction downstream are separated by utilizing WDM and/or OTDM in accordance with selections made by the controller 320 and under control of the controller 320.

Figure 5A:
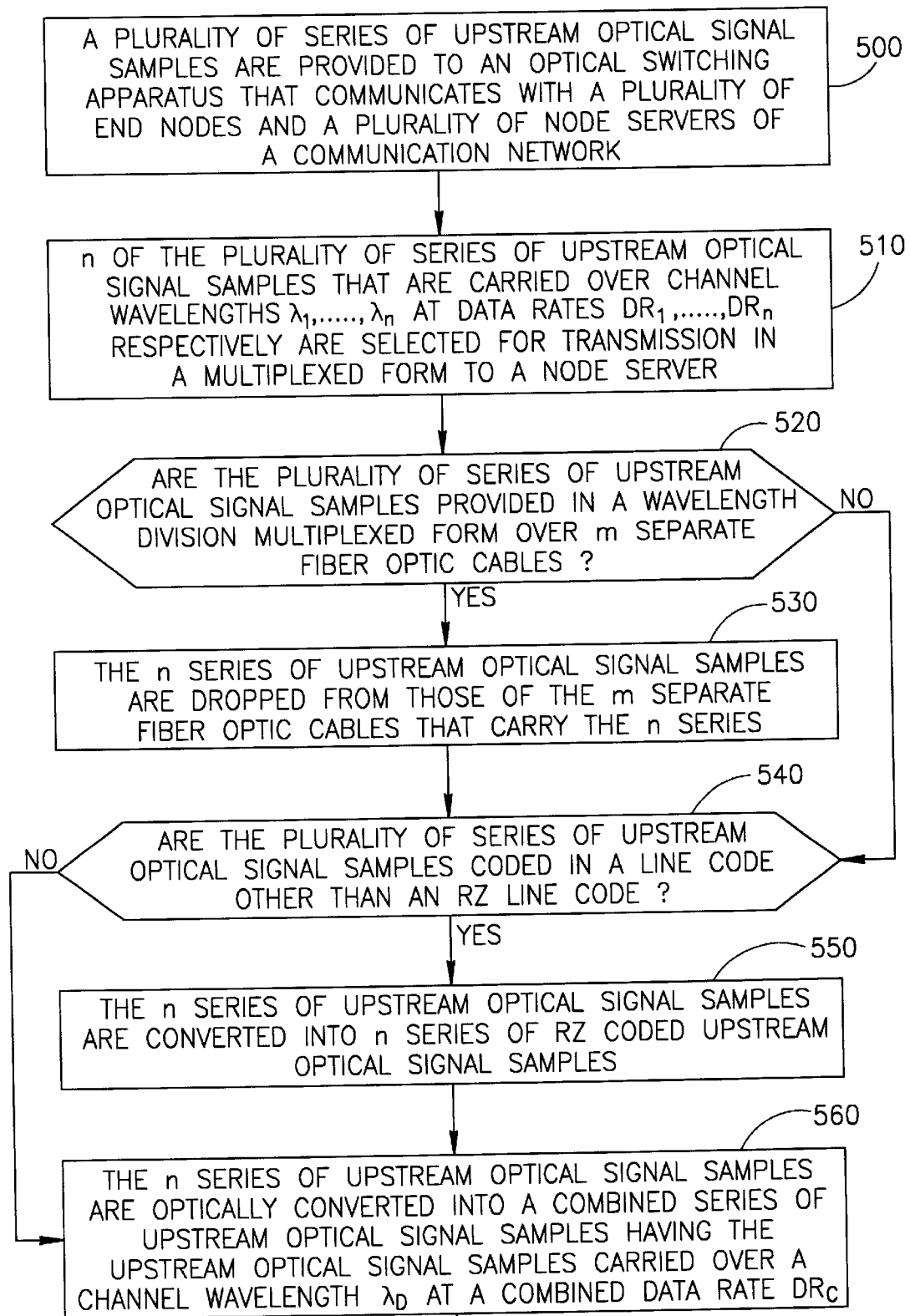
FIGS. 5A–5C together constitute a simplified flowchart illustration of a preferred method of operation of the apparatus of FIGS. 1–4.
Figure 5B:
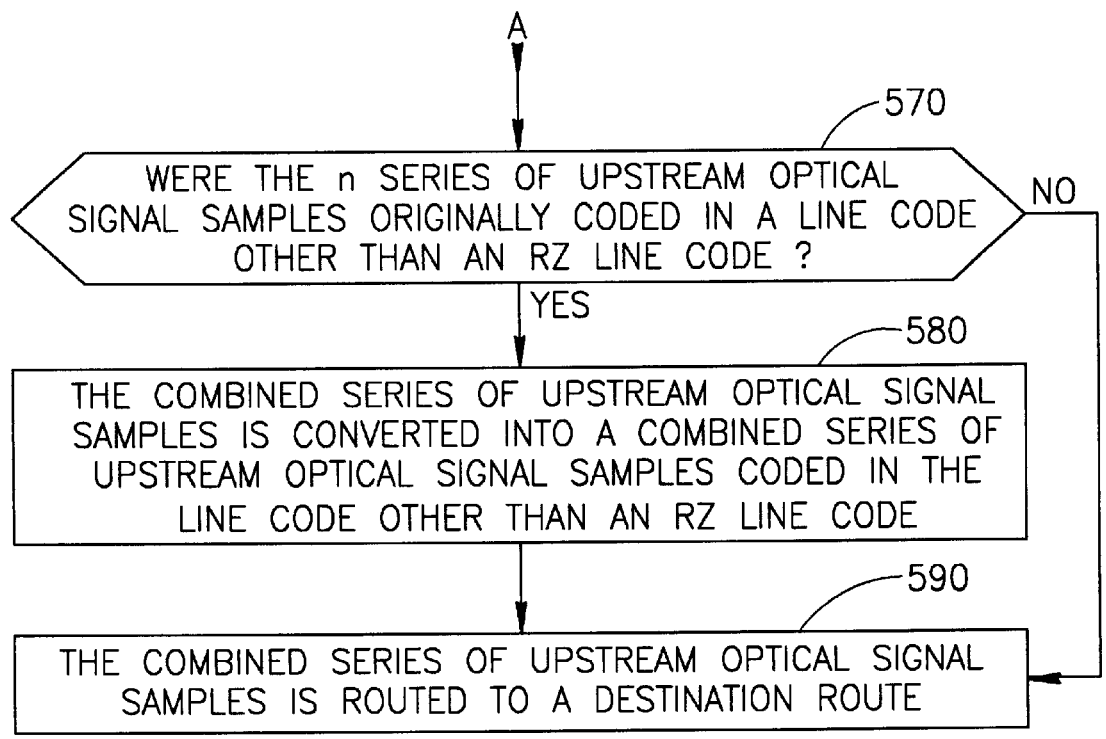

Reference is now made to FIGS. 5A and 5B that together constitute a simplified flowchart illustration of a preferred method of operation of the apparatus of FIGS. 1–4 in upstream communication.

A plurality of series of upstream optical signal samples are preferably provided to an optical switching apparatus that communicates with a plurality of end nodes and a plurality of node servers of a communication network (step 500). Preferably, n of the plurality of series of upstream optical signal samples that are carried over channel wavelengths $\lambda_1, \ldots, \lambda_n$ at data rates $DR_1, \ldots, DR_n$ respectively are selected for transmission in a multiplexed form to a node server (step 510).

If the plurality of series of upstream optical signal samples are provided to the optical switching apparatus in a wavelength division multiplexed form over m separate fiber optic cables (step 520), the n series of upstream optical signal samples are preferably dropped from those of the m separate fiber optic cables that carry the n series of upstream optical signal samples (step 530).

If the plurality of series of upstream optical signal samples are coded in a line code other than an RZ line code (step 540), the n series of upstream optical signal samples are preferably converted into n series of RZ coded upstream optical signal samples (step 550).

Preferably, the n series of upstream optical signal samples are optically converted into a combined series of upstream optical signal samples having the upstream optical signal samples carried over a channel wavelength $\lambda_D$ at a combined data rate $DR_c$ which is greater than any one of $DR_1, \ldots, DR_n$ (step 560). If the n series of optical signal samples were originally coded in a line code other than an RZ line code (step 570), the combined series of upstream optical signal samples is preferably converted into a combined series of upstream optical signal samples coded in the line code other than an RZ line code (step 580). The combined series of upstream optical signal samples is then routed to a destination route for transmission at the combined data rate $DR_c$ to the node server (step 590).

Figure 5C:
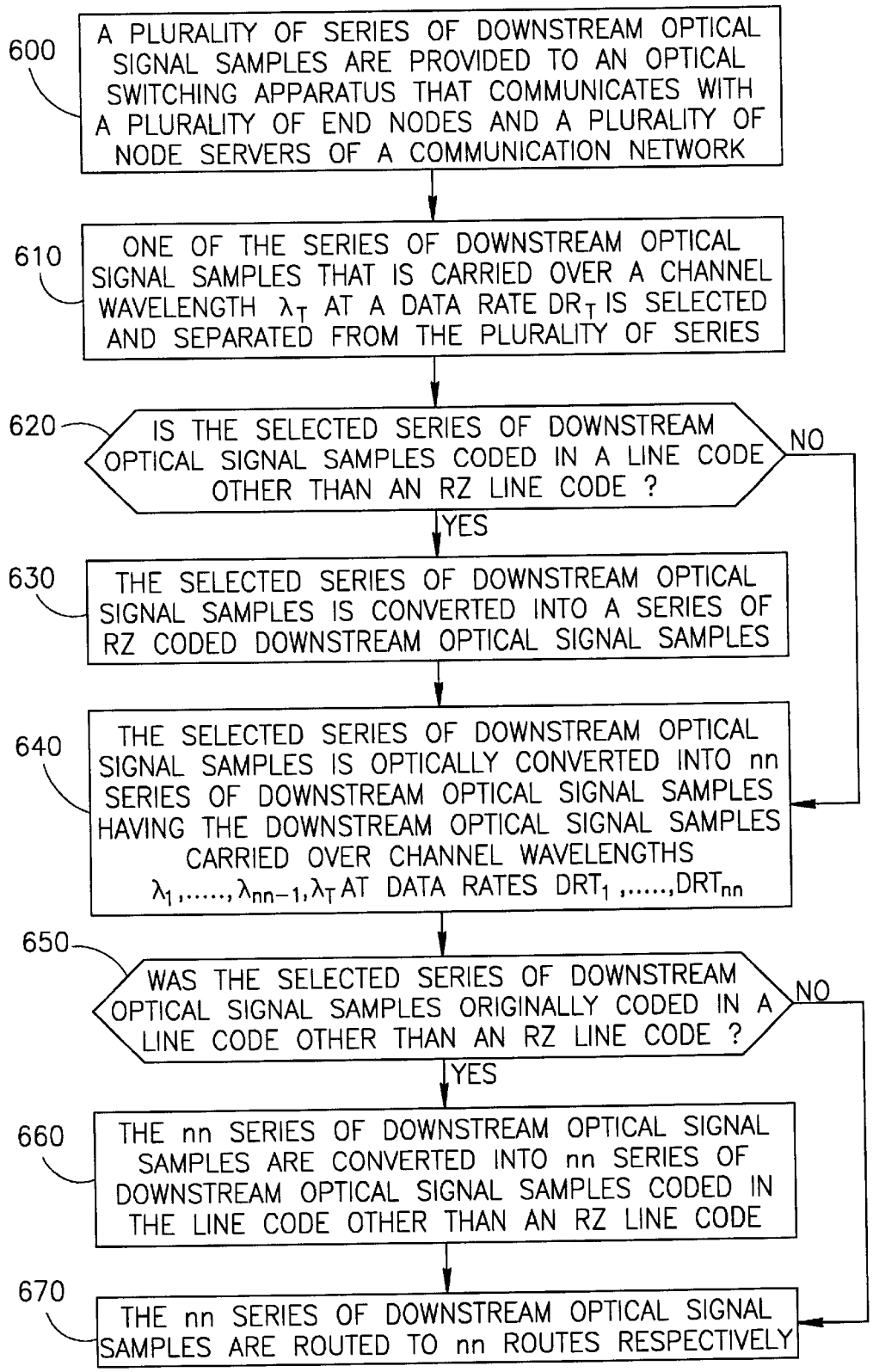

Reference is now made to FIG. 5C which is a simplified flowchart illustration of a preferred method of operation of the apparatus of FIGS. 1–4 in downstream communication.

A plurality of series of downstream optical signal samples are preferably provided to an optical switching apparatus that communicates with a plurality of end nodes and a plurality of node servers of a communication network (step 600). One of the series of downstream optical signal samples that is carried over a channel wavelength $\lambda_T$ at a data rate $DR_T$ is preferably selected and separated (step 610) from the plurality of series of downstream optical signal samples.

If the selected series of downstream optical signal samples is coded in a line code other than an RZ line code (step 620), the selected series of downstream optical signal samples is preferably converted into a series of RZ coded downstream optical signal samples (step 630).

Preferably, the selected series of downstream optical signal samples is optically converted into nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$ (step 640), where nn is an integer, $\lambda_1 \# \lambda_T, \ldots, \lambda_{nn-1} \# \lambda_T$ and each of $DRT_1, \ldots, DRT_{nn}$ is less than $DR_T$.

If the selected series of downstream optical signal samples was originally coded in a line code other than an RZ line code (step 650), the nn series of downstream optical signal samples are preferably converted into nn series of RZ coded downstream optical signal samples (step 660). Preferably, the nn series of downstream optical signal samples are respectively routed to nn routes for transmission, for example, to nn end nodes (step 670).

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

What is claimed is:

1. An optical switching method for switching a plurality of series of upstream optical signal samples to a destination route, the method comprising:

selecting n series of upstream optical signal samples from groups of $k_1, \ldots, k_m$ series of upstream optical signal samples that are respectively carried over m separate fiber optic cables in a wavelength division multiplexed form over channel wavelengths $\{\lambda_{ii,jj}\}$ at data rates $\{DR_{ii,jj}\}$ respectively, the n series of upstream optical signal samples being respectively carried over channel wavelengths $\lambda_1, \ldots, \lambda_n$ at respective data rates $DR_1, \ldots, DR_n$ and comprising series of upstream optical signal samples from at least two of the m separate fiber optic cables, where n and $k_1, \ldots, k_m$ are integers greater than one, m is an integer greater than or equal to two, $n<k_1+\ldots+k_m$, ii is an index running from 1 to m, and jj is an index running from 1 to $k_j$ where j is an index running from 1 to m;

dropping the n series of upstream optical signal samples from those of the m separate fiber optic cables that carry the n series of upstream optical signal samples;

optically converting the n series of upstream optical signal samples into a combined series of upstream optical signal samples having the upstream optical signal samples carried over a channel wavelength $\lambda_D$ at a combined data rate $DR_c$, the channel wavelength $\lambda_D$ being useful for carrying optical signal samples to the destination route; and routing said combined series of upstream optical signal samples to said destination route.

2. A method according to claim 1 and wherein said optically converting step comprises:

converting any of $\lambda_1, \ldots, \lambda_n$ that differ from $\lambda_D$ to $\lambda_D$ thereby forming a group of n series of upstream optical signal samples having the upstream optical signal samples carried over $\lambda_D$; and combining the n series of upstream optical signal samples in said group so as to provide said combined series of upstream optical signal samples.

3. A method according to claim 1 and wherein $DR_c$ is one of the following: equal to $\Sigma_{i=1,\ldots,n} DR_i$; and similar to $\Sigma_{i=1,\ldots,n} DR_i$.

4. A method according to claim 2 and wherein the upstream optical signal samples in each of said n series of upstream optical signal samples are spaced by a time spacing T, and said combining step comprises:

recovering a clock signal $CLK_i$ for each series of upstream optical signal samples in said group;

generating time delays of at least a fraction of T between every two series of upstream optical signal samples in said group so as to create a group of n sequentially delayed series of upstream optical signal samples in which a delay between every two series of upstream optical signal samples is at least a fraction of T; and multiplexing the n sequentially delayed series of upstream optical signal samples in said group so as to provide said combined series of upstream optical signal samples.

5. A method according to claim 1 and wherein said optically converting step using synchronous time-division multiplexing when $DR_1=,\ldots,=DR_n$, and using asynchronous time-division multiplexing when at least some of the data rates $DR_1,\ldots,DR_n$ are different from each other.

6. A method according to claim 1 and wherein said destination route comprises at least one of the following: a destination fiber optic cable capable of carrying optical signal samples at said combined data rate $DR_c$; a wireless communication route; a waveguide; a transmission line; an interface to a destination optical transceiver; and an interface to a destination optical communication system operating at said combined data rate $DR_c$.

7. A method according to claim 1 and wherein the n series of upstream optical signal samples are coded in a line code other than a return-to-zero (RZ) line code, and the method also comprises:

converting the n series of upstream optical signal samples coded in the line code other than an RZ line code into n series of RZ coded upstream optical signal samples prior to said optically converting step; and converting said combined series of upstream optical signal samples into a combined series of upstream optical signal samples coded in the line code other than an RZ line code after said optically converting step.

8. A method according to claim 1 and also comprising the step of selecting said channel wavelength $\lambda_D$ prior to said optically converting step.

9. A method according to claim 1 and wherein said dropping step comprises:

demultiplexing at least those of the groups of $k_1,\ldots,k_m$ series of upstream optical signal samples that include the n series of upstream optical signal samples so as to provide LK demultiplexed series of upstream optical signal samples, where LK is an integer greater than one; and selecting each of the n series of upstream optical signal samples from the LK demultiplexed series of upstream optical signal samples.

10. The method according to claim 1 and wherein said routing step comprises:

performing WDM of the combined series of upstream optical signal samples with other series of upstream optical signal samples that are selected from the groups of $k_1,\ldots,k_m$ series of upstream optical signal samples and are not comprised in the n series of upstream optical signal samples; and routing said combined series of upstream optical signal samples and said other series of upstream optical signal samples in a wavelength division multiplexed form to said destination route.

11. The method according to claim 1 and wherein said selecting step comprises:

providing at least one of criteria and constraints related to combinations of series of upstream optical signal samples acceptable by a destination node server associated with the destination route; and selecting the number of series n in response to said at least one of criteria and constraints.

12. An optical switching method for switching a set of series of downstream optical signal samples multiplexed by WDM in which each series of downstream optical signal samples carries the optical signal samples at a data rate $DR_T$, the method comprising:

separating a series of downstream optical signal samples carried over a channel wavelength $\lambda_T$ from the set;

optically converting the separated series of downstream optical signal samples into nn series of downstream optical signal samples having the downstream optical signal samples carried over channel wavelengths $\lambda_1,\ldots,\lambda_{nn-1},\lambda_T$ at data rates $DRT_1,\ldots,DRT_{nn}$ respectively, where nn is an integer greater than one, $\lambda_1 \# \lambda_T,\ldots,\lambda_{nn-1} \# \lambda_T$ and each of $DRT_1,\ldots,DRT_{nn}$ is less than $DRT_T$;

performing WDM to add at least one of the rest of the series of downstream optical signal samples in said set to one of the nn series of downstream optical signal samples; and routing the at least one of the rest of the series of downstream optical signal samples in said set and the one of the nn series of downstream optical signal samples multiplexed therewith by WDM to a route, and the remaining nn−1 series of downstream optical signal samples to nn−1 routes respectively.

13. A method according to claim 12 and wherein said optically converting step comprises:

separating said separated series of downstream optical signal samples so as to provide a group of nn series of downstream optical signal samples having the optical signal samples in each series of downstream optical signal samples in the group carried over $\lambda_T$ at a respective one of said data rates $DRT_1, \ldots, DRT_{nn}$; and converting $\lambda_T$ of all except one of the series of downstream optical signal samples in the group into said channel wavelengths $\lambda_1, \ldots, \lambda_{nn-1}$ as to provide said nn series of downstream optical signal samples having the downstream optical signal samples carried over the channel wavelengths $\lambda_1, \ldots, \lambda_{nn-1}, \lambda_T$ at the respective data rates $DRT_1, \ldots, DRT_{nn}$.

14. A method according to claim 13 and wherein said separating step comprises using synchronous time-division demultiplexing for separating said separated series of downstream optical signal samples so as to provide said group of nn series of downstream optical signal samples in which $DRT_1=, \ldots, =DRT_{nn}$, and using asynchronous time-division demultiplexing for separating said separated series of downstream optical signal samples so as to provide said group of nn series of downstream optical signal samples in which at least some of the data rates $DRT_1, \ldots, DRT_{nn}$ are different from each other.

15. A method according to claim 12 and also comprising the step of selecting the channel wavelengths $\lambda_1, \ldots, \lambda_{nn-1}$ prior to said optically converting step.

16. A method of communicating between a node server and an end node using an optical communication signal which comprises a series of optical signal samples carried over a channel wavelength $\lambda_D$ at a data rate $DR_c$, the series of optical signal samples being produced by optically converting n series of optical signal samples in which the optical signal samples are respectively carried over channel wavelengths $\lambda_1, \ldots, \lambda_n$ at data rates $DR_1, \ldots, DR_n$, where n is pre-selected in accordance with a received indication indicating a capacity of the node server, and $DR_c$ is greater than any one of $DR_1, \ldots, DR_n$.

17. An optical switching apparatus for switching a plurality of series of upstream optical signal samples to a destination route, the optical switching apparatus comprising:

a controller operative to select n series of upstream optical signal samples from groups of $k_1, \ldots, k_m$ series of upstream optical signal samples that are respectively carried over m separate fiber optic cables in a wavelength division multiplexed form over channel wavelengths $\{\lambda_{ii,jj}\}$ at data rates $\{DR_{ii,jj}\}$ respectively, the n series of upstream optical signal samples being respectively carried over channel wavelengths $\lambda_1, \ldots, \lambda_n$ at respective data rates $DR_1, \ldots, DR_n$ and comprising series of upstream optical signal samples from at least two of the m separate fiber optic cables, where n and $k_1, \ldots, k_m$ are integers greater than one, m is an integer greater than or equal to two, $n < k_1 + \ldots + k_m$, ii is an index running from 1 to m, and jj is an index running from 1 to $k_j$ where j is an index running from 1 to m;

a multiplexing/demultiplexing unit operatively controlled by the controller to drop the n series of upstream optical signal samples selected by the controller from those of the m separate fiber optic cables that carry the n series of upstream optical signal samples;

an upstream optical converter unit operatively associated with the controller and the multiplexing/demultiplexing unit and operative to convert the n series of upstream optical signal samples into a combined series of upstream optical signal samples having the upstream optical signal samples carried over a channel wavelength $\lambda_D$ at a combined data rate $DR_c$, the channel wavelength $\lambda_D$ being useful for carrying optical signal samples to the destination route; and a upstream router operatively associated with the upstream optical converter unit and operative to route said combined series of upstream optical signal samples to said destination route.

18. Apparatus according to claim 17 and wherein said upstream optical converter unit comprises:

an upstream wavelength converter unit operative to convert any of $\lambda_1, \ldots, \lambda_n$ that differ from $\lambda_D$ to $\lambda_D$ thereby forming a group of n series of upstream optical signal samples having the upstream optical signal samples carried over $\lambda_D$; and a combiner operatively associated with the upstream wavelength converter unit and operative to combine the n series of upstream optical signal samples in said group so as to provide said combined series of upstream optical signal samples.

19. Apparatus according to claim 18 and wherein the upstream optical signal samples in each of said n series of upstream optical signal samples are spaced by a time spacing T, and the combiner comprises:

a clock-recovery unit operative to recover a clock signal $CLK_i$ for each series of optical signal samples in said group;

an optical delay mechanism operatively associated with the clock-recovery unit and operative to generate time delays of at least a fraction of T between every two series of upstream optical signal samples in said group so as to create a group of n sequentially delayed series of upstream optical signal samples in which a delay between every two series of upstream optical signal samples is at least a fraction of T; and a multiplexer operatively associated with the optical delay mechanism and operative to multiplex the n sequentially delayed series of upstream optical signal samples in said group so as to provide said combined series of upstream optical signal samples.

20. Apparatus according to claim 17 and wherein the n series of upstream optical signal samples are coded in a line code other than a return-to-zero (RZ) line code, and the apparatus also comprises:

a line code converter unit operatively associated with the upstream optical converter unit and the upstream router and operative to convert the n series of upstream optical signal samples coded in the line code other than an RZ line code into n series of RZ coded upstream optical signal samples prior to conversion of the n series of upstream optical signal samples into said combined series of upstream optical signal samples in the upstream optical converter unit, and to convert said combined series of upstream optical signal samples into a combined series of upstream optical signal samples coded in the line code other than an RZ line code after conversion of the n series of upstream optical signal samples into said combined series of upstream optical signal samples in the upstream optical converter unit.

21. Apparatus according to claim 17 and wherein said multiplexing/demultiplexing unit comprises at least one add drop multiplexer (ADM).

22. A communication network comprising a node server, a plurality of end nodes, and a communication switch comprising the optical switching apparatus of claim 17 in operative association with the node server and the plurality of end nodes.

23. An optical switching apparatus for switching a set of series of downstream optical signal samples multiplexed by WDM in which each series of downstream optical signal samples carries the optical signal samples at a data rate $DRT_T$, the optical switching apparatus comprising:

a first add/drop multiplexer (ADM) separating a series of downstream optical signal samples carried over a channel wavelength $\lambda_T$ from the set;

a downstream optical converter unit operative to optically convert the separated series of downstream optical signal samples into nn series of downstream optical signal samples having the downstream optical signal samples carried over channel wavelengths $\lambda_1, \ldots, \lambda_{nn-1}, \lambda_T$ at data rates $DRT_1, \ldots, DRT_{nn}$ respectively, where nn is an integer greater than one, $\lambda_1 \# \lambda_T, \ldots, \lambda_{nn-1} \# \lambda_T$ and each of $DRT_1, \ldots, DRT_{nn}$ is less than $DR_T$; and a multiplexing/demultiplexing unit comprising at least a second ADM which performs WDM to add at least one of the rest of the series of downstream optical signal samples in said set to one of the nn series of downstream optical signal samples, the multiplexing/demultiplexing unit being operative to route the at least one of the rest of the series of downstream optical signal samples in said set and the one of the nn series of downstream optical signal samples multiplexed therewith by WDM to a route, and the remaining nn-1 series of downstream optical signal samples to nn-1 routes respectively.

24. Apparatus according to claim 23 and wherein said downstream optical converter unit comprises:

a demultiplexer operative to separate said separated series of downstream optical signal samples so as to provide a group of nn series of downstream optical signal samples having the optical signal samples in each series of downstream optical signal samples in the group carried over $\lambda_T$ at a respective one of said data rates $DRT_1, \ldots, DRT_{nn;}$ and a downstream wavelength converter unit operatively associated with the demultiplexer and operative to convert $\lambda_T$ of all except one of the series of downstream optical signal samples in the group into said channel wavelengths $\lambda_1, \ldots, \lambda_{nn-1}$ so as to provide said nn series of downstream optical signal samples having the downstream optical signal samples carried over the channel wavelengths $\lambda_1, \ldots, \lambda_{nn-1}, \lambda_T$ at the respective data rates $DRT_1, \ldots, DRT_{nn}$.

25. A communication network comprising a node server, a plurality of end nodes, and a communication switch comprising the optical switching apparatus of claim 23 in operative association with the node server and the plurality of end nodes.

26. An optical switching method for switching a plurality of series of upstream optical signal samples that are spaced by a time spacing T to a destination route, the method comprising:

receiving n series of upstream optical signal samples in an unsynchronized form, each of the n series of upstream optical signal samples being carried over a channel wavelength $\lambda_i$, where n is an integer and i is an index running from 1 to n;

optically converting any of the $\lambda_i$ that differ from a channel wavelength $\lambda_D$ to $\lambda_D$ thereby forming a group of n series of upstream optical signal samples having the upstream optical signal samples carried over $\lambda_D$;

recovering a clock signal $CLK_i$ for each series of upstream optical signal samples in said group;

generating time delays of at least a fraction of T between every two series of upstream optical signal samples in said group so as to create a group of n sequentially delayed series of upstream optical signal samples in which a delay between every two series of upstream optical signal samples is at least a fraction of T;

multiplexing the n sequentially delayed series of upstream optical signal samples in said group of n sequentially delayed series of upstream optical signal samples so as to provide a combined series of upstream optical signal samples having the upstream optical signal samples carried over $\lambda_D$; and routing said combined series of upstream optical signal samples to said destination route.

27. The method according to claim 26 and also comprising, prior to the receiving step:

receiving, from a node server associated with the destination route, an indication of a capacity of the node server; and selecting the number of series n in response to said indication.

28. The method according to claim 26 and also comprising the step of selecting, prior to the optically converting step, said channel wavelength $\lambda_D$ in response to an instruction received from a node server associated with the destination route.

29. An optical switching method for switching n series of upstream optical signal samples to a destination route, each of the n series of upstream optical signal samples being carried over a channel wavelength $\lambda_i$, where n is an integer and i is an index running from 1 to n, the method comprising:

receiving the n series of upstream optical signal samples in an unsynchronized form;

optically converting any of the $\lambda_i$ that differ from a channel wavelength $\lambda_D$ to $\lambda_D$ thereby forming a group of n series of upstream optical signal samples having the upstream optical signal samples carried over $\lambda_D$;

recovering a clock signal $CLK_i$ for each series of upstream optical signal samples in the group to enable performance of OTDM of the series of upstream optical signal samples in the group;

performing OTDM of the series of upstream optical signal samples in the group to provide a combined series of upstream optical signal samples having the upstream optical signal samples carried over $\lambda_D$; and performing WDM of the combined series of upstream optical signal samples with other optical signal samples provided over channel wavelengths other than $\lambda_D$.

30. An optical switching apparatus for switching a plurality of series of upstream optical signal samples that are spaced by a time spacing T to a destination route, the apparatus comprising:

spatially separated receiving ports for receiving n series of upstream optical signal samples in an unsynchronized form, each of the n series of upstream optical signal samples being carried over a channel wavelength $\lambda_i$, where n is an integer and i is an index running from 1 to n;

a wavelength converter unit optically converting any of the $\lambda_i$ that differ from a channel wavelength $\lambda_D$ to $\lambda_D$ thereby forming a group of n series of upstream optical signal samples having the upstream optical signal samples carried over $\lambda_D$;

a clock-recovery unit recovering a clock signal $CLK_i$ for each series of upstream optical signal samples in said group;

an optical delay mechanism generating time delays of at least a fraction of T between every two series of upstream optical signal samples in said group so as to create a group of n sequentially delayed series of upstream optical signal samples in which a delay between every two series of upstream optical signal samples is at least a fraction of T;

a multiplexing/demultiplexing unit multiplexing the n sequentially delayed series of upstream optical signal samples in said group of n sequentially delayed series of upstream optical signal samples so as to provide a combined series of upstream optical signal samples having the upstream optical signal samples carried over $\lambda_D$; and an upstream router routing said combined series of upstream optical signal samples to said destination route.

31. The apparatus according to claim 30 and also comprising:

a controller; and at least one positioner controlled by the controller for directing the n series of upstream optical signal samples to at least one wavelength converter in the wavelength converter unit.

32. The apparatus according to claim 30 and also comprising a controller which selects, based on sensed phase variations between the n series of upstream optical signal samples, delay generators or a delay line setup for providing said time delays of at least a fraction of T.

33. The apparatus according to claim 30 and wherein said multiplexing/demultiplexing unit comprises an asynchronous time-division multiplexer and the apparatus also comprises a controller which selects delay generators or delay line setups to provide said time delays as a series of variably growing time delays for use by the asynchronous time-division multiplexer in performing asynchronous TDM.

* * * * *